United States Patent [19]

Yoshimi et al.

[11] Patent Number: 5,775,415
[45] Date of Patent: Jul. 7, 1998

[54] AIR CONDITIONING SYSTEM

[75] Inventors: Tomohisa Yoshimi, Gamagoori; Takayoshi Kawai, Hoi-gun; Yuji Ito, Ichinomiya; Masafumi Kawashima, Kariya; Yuji Honda, Okazaki; Katsuhiko Samukawa, Oobu, all of Japan

[73] Assignee: Nippondenso Co., Ltd., Kariya, Japan

[21] Appl. No.: 271,465

[22] Filed: Jul. 7, 1994

[30] Foreign Application Priority Data

| Jul. 7, 1993 | [JP] | Japan | 5-168173 |
| Sep. 16, 1993 | [JP] | Japan | 5-230182 |
| Nov. 15, 1993 | [JP] | Japan | 5-285078 |
| Mar. 2, 1994 | [JP] | Japan | 6-032675 |

[51] Int. Cl.⁶ ........................... F25B 29/00
[52] U.S. Cl. ............... 165/202; 165/243; 165/263; 165/42; 165/43; 165/291; 165/254; 62/229; 62/180
[58] Field of Search ............... 165/42, 43, 30, 165/202, 243, 254, 263, 291; 62/180

[56] References Cited

U.S. PATENT DOCUMENTS

| 3,670,808 | 6/1972 | Wait, Jr. | 165/42 |
| 4,323,111 | 4/1982 | Iijima | 165/30 |
| 4,365,663 | 12/1982 | Inoue et al. | |
| 4,448,035 | 5/1984 | Moriyama et al. | 165/43 |
| 4,456,055 | 6/1984 | Yoshimi et al. | 165/43 |
| 4,466,480 | 8/1984 | Ito et al. | 165/30 |
| 4,476,919 | 10/1984 | Akimoto et al. | 165/30 |
| 4,540,040 | 9/1985 | Fukumoto et al. | 165/30 |
| 4,651,812 | 3/1987 | Biber et al. | 165/43 |
| 4,766,950 | 8/1988 | Yamada et al. | 165/30 |

FOREIGN PATENT DOCUMENTS

| 5939333 | 9/1984 | Japan |
| 6117682 | 5/1986 | Japan |
| 1136809 | 5/1989 | Japan |

Primary Examiner—John K. Ford
Attorney, Agent, or Firm—Cushman, Darby & Cushman Ip Group of Pillsbury Madison & Sutro LLP

[57] ABSTRACT

An air conditioning system for an automobile having an evaporator, in a refrigerating circuit, and a heater core which is located downstream from the evaporator in a duct having an inlet for introduction of air and an outlet for discharging the air into a cabin, and an air mix damper for controlling the ratio of the amount of air into the heater core and the amount of air by-passing the heater core. The degree of the opening of the air mix damper is controlled in accordance with the cooling capacity at the evaporator sensed by an after-evaporator temperature sensor so that a target value of the temperature of the air discharged into the cabin is obtained. A correction of the degree of opening of the air mix damper is done by estimating an actual temperature at the after-evaporator sensor during a transient state of the system between the ON and OFF conditions of a compressor, so that a desired setting of the air conditioning state is maintained.

The target air temperature is not corrected if it is determined that the system is in a heating mode.

10 Claims, 28 Drawing Sheets

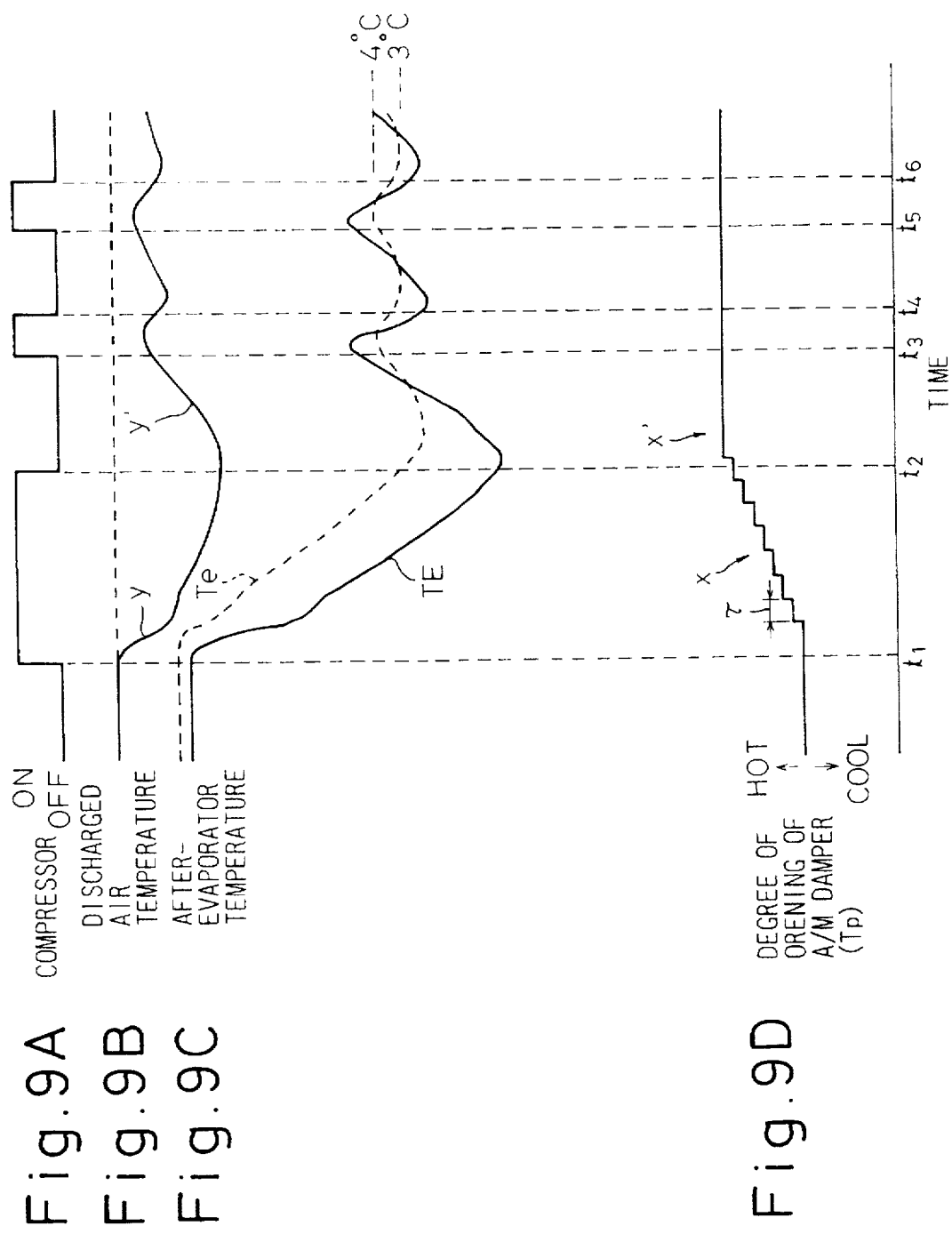

AIR CONDITIONING SYSTEM

BACKGROUND OF THE INVENTION

1. Field of the Invention

The present invention relates to an air conditioning system for an automobile.

2. Description of Related Art

Known in the prior art is an air conditioning system for an automobile having a duct for introduction of air into a cabin, which includes an evaporator located in a refrigerating system, an air mix damper downstream from the evaporator, and a heater core downstream from the air mix damper. The air mix damper controls the ratio of the amount of the air introduced into the heater core to the total amount of air from the evaporator so as to control the temperature of the air issued from the duct into the cabin.

A temperature sensor is arranged at a location at the outlet of the evaporator for detecting the temperature of the air at the outlet of the evaporator. A control system is provided for switching off a compressor in the refrigerating circuit when the detected outlet temperature of the evaporator is lower than a predetermined value, thereby preventing the evaporator from frosting-up. However, due to a delay in the response of the temperature sensor, such an on-off control causes the temperature at the outlet of the evaporator to vary, which causes the temperature of the air introduced into the cabin to vary.

Thus, a technique has heretofore been proposed wherein, in order to reduce the temperature variation caused by the on-off control of the compression, a correction to a target value of the degree of opening of the air mix damper is made in accordance with the temperature of the air at the outlet of the evaporator sensed by the after-evaporator sensor. Note, this prior art is referred as a prior art A.

As other prior art for example Japanese Un-Examined Patent Publication No. 57-209412 or Japanese Un-Examined Patent Publication No. 59-167313, it has been proposed that the degree of the opening of the air mix damper is varied between the energized (ON) condition and the de-energized (OFF) condition, of the compressor. Note, this prior art is referred as a prior art B.

In the prior art A, the after-evaporator temperature sensor is usually constructed from a thermistor, which has some heat capacity, which causes the response to a detected temperature to be delayed when the system is under a transient state, which makes the detected temperature different from an actual after-evaporator temperature for a period of several seconds just after a change of the condition of the compressor between ON and OFF conditions, thereby causing the discharged air temperature fluctuate. The solution of reducing the heat capacity of the sensor to improve a response is not practical. This is because the durability of the sensor is inevitably reduced, which is not suitable for an after-evaporator sensor, which is arranged at a location downstream of the evaporator in a relatively severe environment or the sensor is subjected to large temperature differences and splashes of condensed water. Namely, in order to increase a durability, it is unavoidable that the sensor has a substantial degree of delay in response to a change in the temperature.

In prior art B, the characteristics of the degree of opening of the air mix damper for ON and OFF conditions are determined when the after-evaporator temperature is stable. Thus, a desired correction cannot be done during the transient state during a period of about several tens of seconds after the compressor is switched ON or OFF, which is not effective for reducing the temperature fluctuation of air discharged into the cabin.

During the transient state just after switching ON or OFF the compressor by means of depressing the manual air conditioning switch, an undesired change in air conditioning condition is also generated during heating the automatic air conditioning system. Namely, in such an automatic air conditioning system, when the air conditioning switch is turned OFF, a target value of the temperature is reduced by an amount to compensate for a temperature increase felt by a passenger due to an increase in humidity caused by the stopping of the evaporator, thereby maintaining an apparent constant temperature. However, such a reduction of the target temperature causes the passenger to feel that the heating operation is insufficient.

SUMMARY OF THE INVENTION

An object of the present invention is to provide an air conditioning system capable of reducing a temperature variation to as small a variation as possible during a transient state which is generated when a cooling capacity is changed.

According to a first aspect of the preset invention, a system for air conditioning of a cabin to be air conditioned is provided, comprising:

(a) a duct for introducing a flow of the air into the cabin;

(b) a cooling means arranged in the duct to contact the air flow for cooling;

(c) a heating means arranged in the duct to contact the air flow to heat the cooled air;

(d) means for detecting the cooling capacity of the cooling means;

(e) means, responsive to the detected cooling capacity, for controlling the heating capacity to obtain a desired setting of an air conditioning condition at the cabin, and;

(f) means, in accordance with a change of the state of the cooling means, for correcting the heating capacity, thereby maintaining a desired air conditioning effect.

According to a another aspect of the present invention, a system for air conditioning of a cabin to be air conditioned is provided, comprising:

(a) a duct for introducing a flow of the air into the cabin;

(b) a cooling means arranged in the duct in contact with the air flow to cool the air;

(c) a heating means arranged in the duct to contact the air flow to heat the cooled air;

(d) means for detecting, with a delay, the cooling capacity of the cooling means;

(e) means, responsive to the detected cooling capacity, for controlling the heating capacity to obtain a desired air conditioning condition in the cabin;

(f) means for obtaining an estimation of the actual cooling capacity of the cooling means so that the effect of the delay is canceled;

(g) means, in accordance the estimated actual cooling capacity, for correcting the heating capacity, thereby maintaining a desired air conditioning effect.

According to still another aspect of the invention, a system for air conditioning a cabin of a vehicle to be air conditioned is provided, comprising:

(a) a duct for introducing a flow of the air into the cabin;

(b) a refrigerating circuit for a refrigerant having a compressor and an evaporator which is arranged in the duct to contact the air flow in the duct, so that a heat exchange occurs between the refrigerant in the evaporator and the air in the duct;

(c) a heating means arranged in the duct in contact with the air flow to heat the cooled air from the evaporator;

(d) means, responsive to manipulation by a passenger, for issuing a first signal for energizing the compressor;

(e) means, responsive to manipulation by a passenger, for issuing a second signal for de-energizing the compressor;

(f) means for detecting at least one environmental parameter;

(g) means for setting a cabin temperature which is desired by a passenger;

(h) means, based on the detected environmental parameter and the setting of the temperature, for calculating a heating amount for the air discharged into the cabin from the duct;

(i) means for calculating a corrected amount so that the heating amount is reduced for a predetermined value, when the compressor is de-energized by the second signal, when compared with the heating amount when the compressor is energized by the first signal;

(j) means for controlling the heating means so that a heating amount corrected by the correcting means is obtained when the calculated heating amount is smaller than a predetermined value, and;

(k) means for controlling the heating means so that a calculated heating amount is obtained when the calculated heating amount is higher than a predetermined value.

BRIEF EXPLANATION OF THE DRAWINGS

FIGS. 9A to 9D are time charts illustrating an operation of compressor, a discharged air temperature, an after-evaporator temperature and a degree of opening of the air mix damper, respectively, in the present invention shown in FIG. 3.

DESCRIPTION OF PREFERRED EMBODIMENTS

Figure 1:
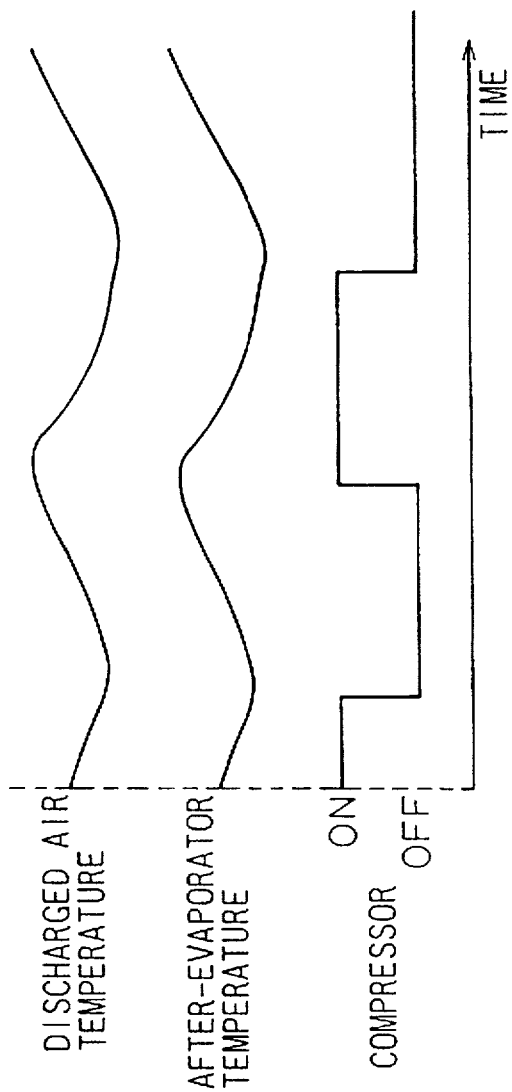
FIGS. 1A to 1C are time charts illustrating changes in discharge air temperature, after-evaporator temperature, and an operation of a compressor, respectively as obtained using a prior art construction.
Figure 2:
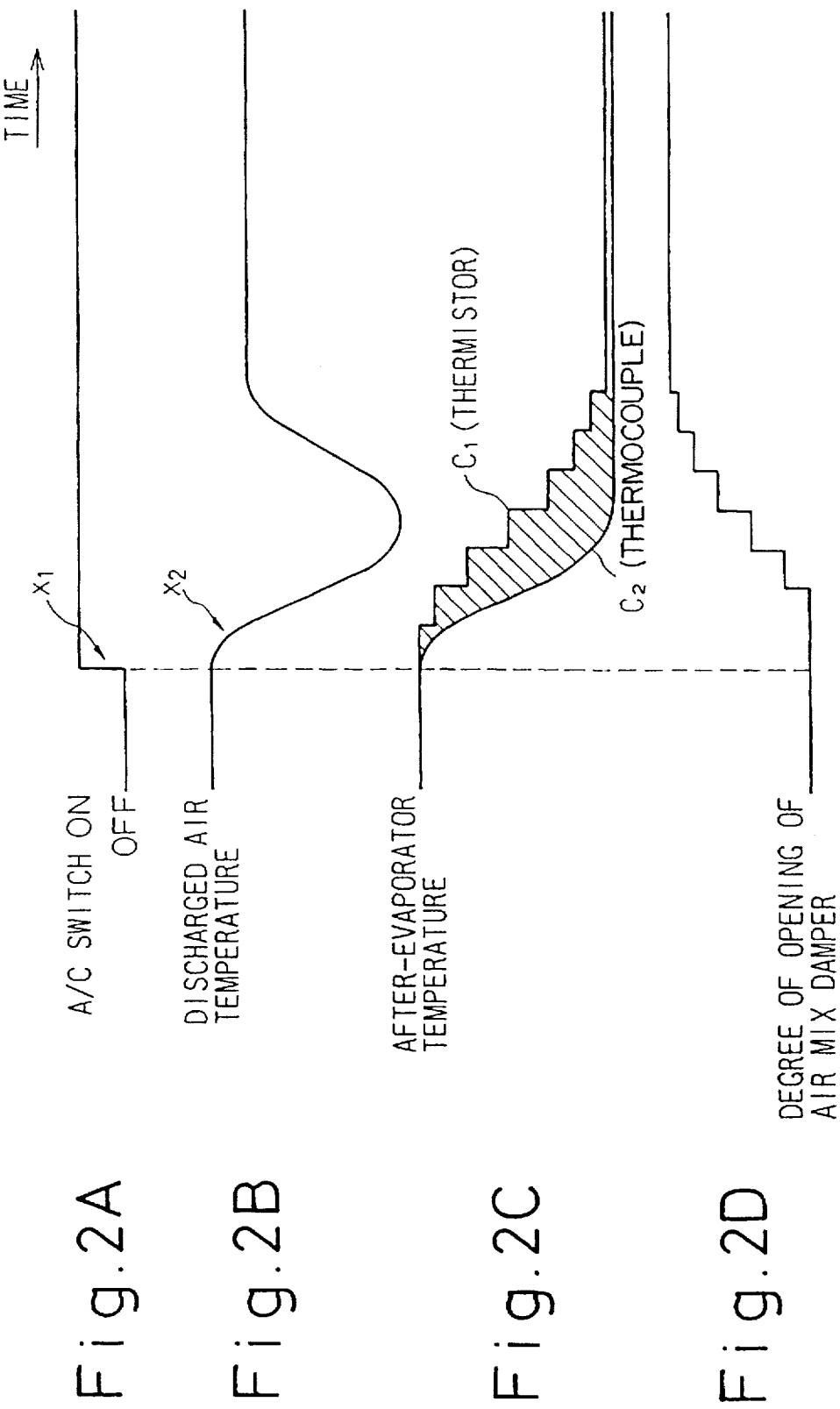
FIGS. 2A to 2D are time charts illustrating an operation of an air conditioning switch, a discharged air temperature, after-evaporator temperature, and a degree of opening of an air mix damper, respectively as obtained by a prior art construction.

First, a problem in the prior art, to be solved by the present invention, will be explained. Namely, FIGS. 1A and 1B show changes in the air temperature discharged into a cabin and the temperature of the air at the outlet of the evaporator (after-evaporator temperature) with respect to the changes of the condition of the compressor between ON and OFF conditions as shown in FIG. 1C. In the prior art, with respect to the change in the condition of the compressor as shown in FIG. 1C, a certain delay exist for the discharged air temperature in FIG. 1A and as the after evaporator temperature in FIG. 1B. A reason of such an inconsistency between the state of the compressor and the temperature will now be explained. Namely, FIG. 2A illustrates a point $x_1$ of the change in the state of the compressor from an OFF state to an ON state. FIG. 2B illustrates a drop in the discharged air temperature after the switching on of the compressor. It is desirable that such a drop $x_2$ in the temperature is as small as possible. In FIG. 2C, curve $C_1$ shows a change in the outlet value of a sensor as a thermistor for detecting after-evaporator temperature. Since the thermistor has a certain amount of a heat capacity, the detected value is delayed with respect to the ON operation of the compressor. Curve $C_2$ shows a detected value of the after-evaporator temperature when an idealized sensor such as a thermo-couple is used with small delay. Thus, an area of shaded lines illustrate a total effect of a delay of the sensor for detecting the after-evaporator temperature. Such a delay in the sensor causes the response of the control of the air mix damper to be delayed as shown in the curve in FIG. 2D.

Figure 3:
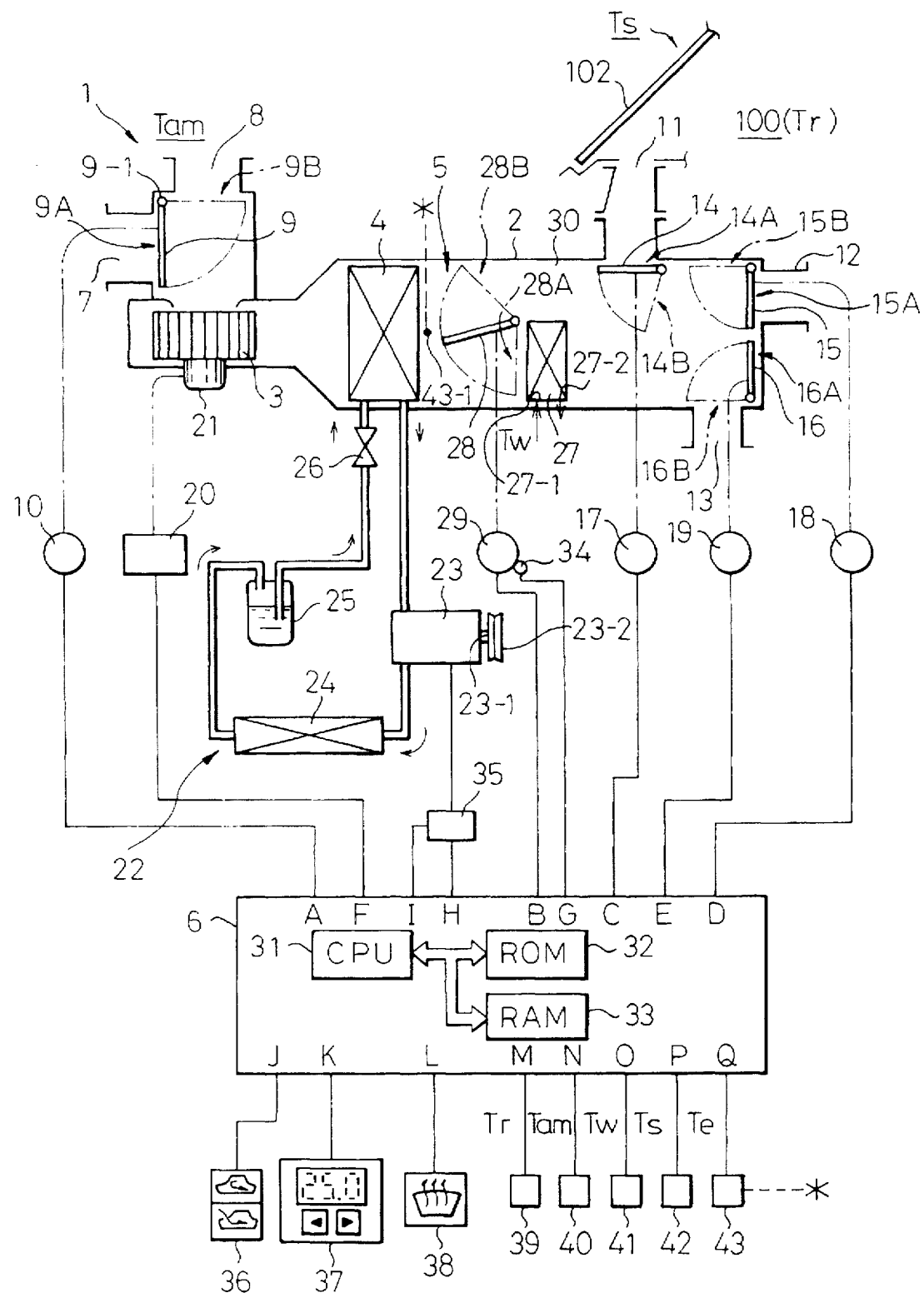
FIG. 3 is a schematic view of a construction of an automatic type air conditioning system for an automobile.

FIG. 3 generally illustrates an automated air conditioning system for an automobile. The system includes, basically, a duct 2 for introducing air into a cabin 100 of the automobile, a blower 3 arranged in the duct 2 for generating air flow in the duct directed to the cabin, an evaporator 4 for cooling the air from the blower 3, an air mix type temperature control unit 5 for controlling the temperature of air discharged into the cabin, and an electrical control unit 6 generating electric signals for controlling various control units.

The duct 2 is, at its inlet side, provided with a first or inside air inlet 7 and a second or outside air inlet 8, and a switching damper 9 which is rotatable about an axis 9-1 for switching between the inside and outside inlets 7 and 8. The damper 9 is formed as a plate member and is connected to a servo motor 10 as a drive motor for obtaining the rotating movement of the damper 9 about the axis 9-1. The motor 10 rotates the damper 9 between an outside air intake position as shown by a solid line 9A where the damper 9 closes the inside air inlet 7, while opening the outside air inlet 8, so that air outside from the cabin (outside air) is introduced into the duct 2, and an inside air intake position as shown by a dotted line 9B where the damper 9 closes the outside air inlet 8, while opening the inside air inlet 7, so that air from the cabin 100 (inside air) is introduced or recirculated into the duct 7. In place of the plate type damper as shown in FIG. 3, a film type damper, which is itself well known, can be employed. Furthermore, in place of the servo motor 10, a stepping motor or any other kind of drive means for obtaining a rotating movement can be employed.

The duct 2 is, at the outlet side thereof, provided with a defroster outlet 11 opened to the cabin 100 at a bottom of a windshield 102, an upper level outlet 12 opened to the cabin 100 at a location corresponding to the position of the face of a driver or a passenger, and a lower level outlet 13 opened to the cabin 100 at a location corresponding to the position of the feet of a driver or a passenger. Arranged adjacent to the defroster outlet 11, the upper outlet 12 and the lower outlet 13, at their inner ends, are a defroster damper 14, an upper outlet damper 15 and a lower outlet damper 16, respectively.

The defroster damper 14 is formed as a plate member, and is connected to a servo motor 17, as a driving means, for rotating the damper between a closed position as shown by a solid line 14A where the defroster outlet 11 is closed and an opened position as shown by a dotted line 14B where the defroster outlet is opened. The upper outlet damper 14 is also formed as a plate member and is connected to a servo motor 18, as a driving means, for rotating the damper between a closed position as shown by a solid line 15A where the upper outlet 12 is closed and an opened position as shown by a dotted line 15B where the upper outlet 12 is opened. The lower outlet damper 16 is also formed as a plate member and is connected to a servo motor 19, as a driving means, for rotating the damper between an opened position as shown by a solid line 16A where the lower outlet 13 is opened and a closed position as shown by a dotted line 16B where the lower outlet 13 is closed.

The air conditioning system has various modes of operation, such as an upper outlet mode (face mode), a bi-level mode, a lower outlet mode (foot mode) and a foot-defroster mode. At the upper outlet mode, a cooled air flow is discharged from the upper outlet 12 to the cabin toward an upper part of the passenger. At the bi-level mode, a cooled air flow is discharged from the upper outlet 12 to the cabin toward an upper part of the passenger while a hot flow is discharged from the lower outlet 13 toward a lower part of the passenger, so as to obtain so called "head is cool and feet are warm" state. At the lower outlet mode, a hot air flow is discharged from the lower outlet 13 toward a lower part of the passenger. At the foot-defroster mode, a hot air flow is mainly discharged from the defroster outlet 11 toward the bottom inner surface of the wind shield, and from the lower outlet 13 toward the lower part of the passenger. Finally, at the defroster mode, a hot air flow is discharged from the defroster outlet 11 toward the bottom inner surface of the wind shield. In place of the dampers 14 to 16, film dampers may be used, and, in place of the servo-motors 17 to 19, other kinds of rotating means, such as stepping motors, can be employed.

A blower operating circuit 20 is provided for controlling the voltage of the electric power applied to the blower motor 21 for rotating the blower 3 and thus controlling the air flow directed to the cabin in the duct 2.

The evaporator 4 is arranged in the duct 2 so that it extends across the entire width of the passageway in the duct 2 so that a heat exchange takes place between the flow of the refrigerant in the evaporator and the air flow in the duct 2, thereby cooling the air flow. The evaporator 4 constructs, together with a compressor 23, a condenser 24, a receiver 25 and an expansion valve 26, a refrigerating system. Namely, he gaseous refrigerant at a high pressure from the compressor 23 is condensed to a liquid state at the condenser 24, a separation of the liquid state refrigerant takes place at the receiver 25, the separated refrigerant is directed to the expansion valve 26, where the pressure of the liquid refrigerant is reduced, and the refrigerant at a reduced pressure is, at the evaporator 4, evaporated and directed to the compressor 23 for the following cycle. The compressor 23 is capable of obtaining a varied amount of the recirculated refrigerant. The compressor is provided with a rotating shaft 23-1 having a pulley 23-2 with a clutch (not shown) connected to a crankshaft (not shown) of an internal combustion engine via a belt (not shown), so that a rotational movement of the crankshaft is transmitted to the compressor 23 when the clutch is engaged. In other words, an engaged condition of the clutch causes the compressor 23 to be operated, which allows the refrigerating system to be operated, so that the air contacting with the evaporator 4 is cooled. Contrary to this, a disengaged condition of the clutch causes the compressor 23 to be stopped, which puts the refrigerating system out of operation, so that the cooling of the air contacting with the evaporator is stopped.

The discharged air temperature controlling device 5 is, according to this embodiment, constructed by a heater core 27 and an air mix damper 28 located between the evaporator 4 and the heater core 27. The heater core 27 is for exchanging heat between air flowing in the duct 2 and engine cooling water flowing in the heater core 27. The heater core 27 has an inlet 27-1 for receiving the cooling water at a high temperature from an engine cooling water jacket (not shown) of the internal combustion engine, and an outlet 27-2 for returning the engine cooling water to the water jacket after heat is exchanged with the air flow in the duct 2.

An air mix damper 28, which is arranged between the evaporator 4 and the heater core 27 via a by-pass passageway 30, is made as a plate member capable of rotating about an axis. The shaft is connected to a servo-motor 29, as a rotating drive means, so that the air mix damper 28 is moved between a first position 28A, where the heater core 27 is closed, and so that all of the air from the evaporator by-passes the heater core 27, and a second position 28B, where the heater core 27 is opened, so that all of the air from the evaporator passes the heater core 27. Furthermore, the air mix damper 28 can take a desired position between the first and second extreme positions 28A and 28B. As a result, the amount of the air passed through the heater core 27, i.e., the ratio of the amount of the cool air by-passing the heater core 27 to the amount of hot air passed through the heater core 27, is continually controlled in accordance with the degree of the opening of the air mix damper. Thus, a continuous control of the temperature of the air as a mixture of the cool air and the hot air is obtained. In place of the plate damper, the air mix damper may be constructed as a film damper. Furthermore, in place of the servo motor 29, any kind of rotating means such as a stepping motor can be employed.

The control unit 6 is constructed as a microcomputer unit, which, basically, includes a central processing unit (CPU) 31, a read only memory (ROM) 32 and a random access memory (RAM) 33. Programs and data are stored in the memories for executing the various control operations according to the present invention. The CPU 31 is provided with a timer for counting the lapse time $T_{OFF}$ after the compressor 23 is switched off.

The control unit 6 is provided with terminals A, B, C, D, and E connected to the servo motors 10, 29, 17, 18 and 19, respectively for issuing signals for operating the dampers 9, 28, 14, 15 and 16, respectively. The control unit 6 is further provided with a terminal F connected to the blower drive circuit 20 for operating the blower motor 21 and a terminal G connected to a sensor 34 for detecting the degree of the opening $\theta$ of the air mix damper 28. The sensor 34 is, for example, constructed as a potentiometer, the value of the electric resistance of which is varied in accordance with the degree $\theta$ of the opening of the air mix damper 28. The control unit 6 is further provided with a terminal H connected to a compressor drive circuit 35 which is connected to the compressor 23 for selectively operating the clutch (not shown), and a terminal I connected to a sensor (not shown) for detecting an electric current in the electromagnetic clutch of the compressor 23. The controller unit 6 is further provided with terminals J, K and L, which are connected to an air inlet selection switch 36, a temperature setting switch 37 and a mode selection switch 38, respectively. Furthermore, the control unit 6 is provided with terminals M, N, O, P and Q, which are connected to a sensor 39 for detecting the inside air temperature, a sensor 40 for detecting the outside air temperature, a sensor 41 for detecting an engine cooling water temperature, a sensor 42 for detecting an sun radiation amount to the cabin, and a sensor (after-evaporator temperature sensor) 43 for detecting the temperature of the air in the duct 2 at a location downstream from the evaporator 4.

Figure 4:
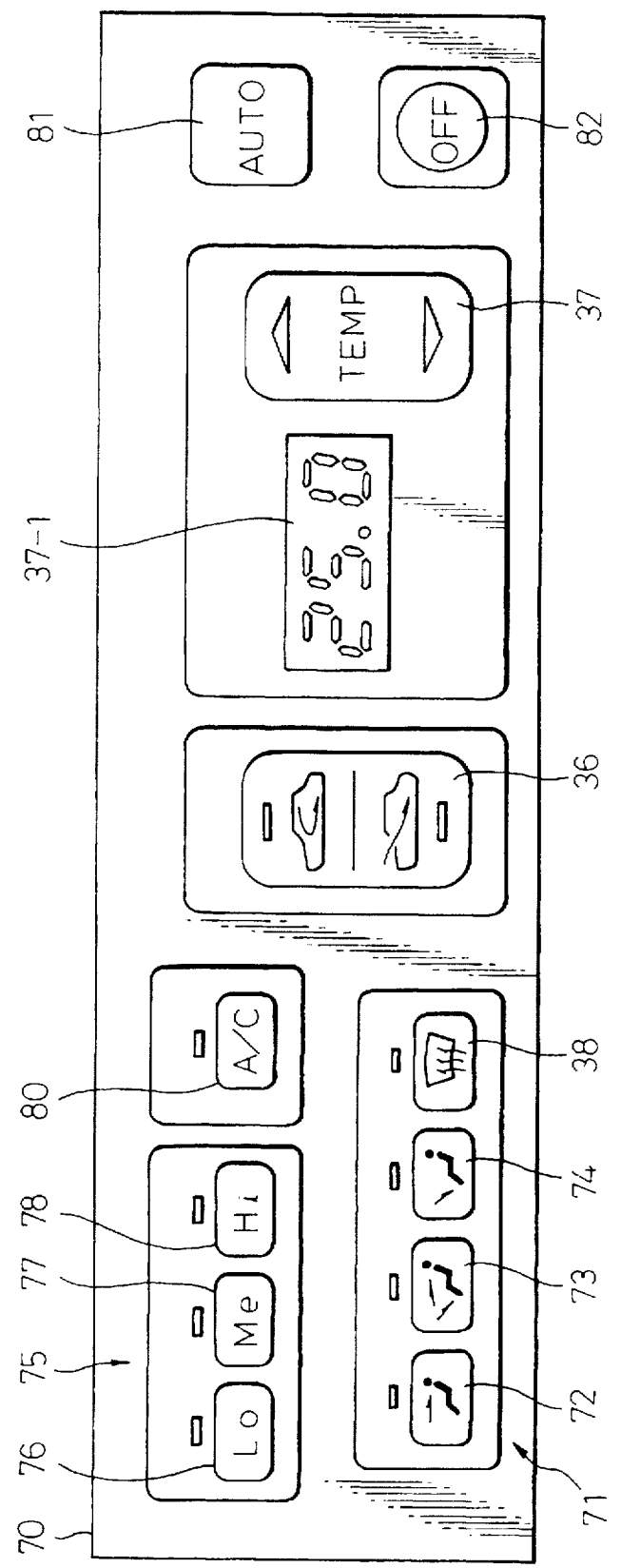
FIG. 4 is a schematic view of an arrangement of a control panel of the air conditioning device in FIG. 3 in a cabin.

FIG. 4 illustrates an arrangement of a instrument panel 70 inside the cabin. The selection switch 36 is for selecting between the outer air intake mode where the damper 9 is positioned as shown by the line 9A in FIG. 3 for introducing outside air from the inlet 8 and the inner air intake mode where the damper 9 is positioned as shown by the line 9B in FIG. 3 for introducing the inside air from the inlet 7. The temperature set switch 37 is for obtaining a setting of the temperature of the air discharged to the cabin 100. A indicator 37-1 is provided for obtaining an indication of the set temperature. A defroster switch 38 is for obtaining the defroster mode where the damper 14 is moved to the opened position 14B in FIG. 3. In addition to these switches, switches not shown in FIG. 3, but connected similarly to the control unit 6 are also provided. Namely, a mode selection unit 71 is constructed by, in addition to the defroster switch 38, a upper mode switch 72, a bi-level mode switch 73, and a lower owlet mode switch 74. A selection of a desired one from the switches in the mode selection section 71 allows the system to be switched to the designated mode, as is well known. An air amount selection section 75 includes a low amount switch 76, a medium amount switch 77 and a high amount switch. A selection of a switch from the switches 76, 77 and 78 allows the blower 3 to be controlled to the desired speed for obtaining the designated air flow amount in the duct 2. An A/C switch 80 is for commencing an air conditioning (cooling) operation for the cabin 100. A switch 81 is for making the air conditioning system to enter into an automated mode, and a switch 82 is for canceling the operation of the air conditioning apparatus.

Again in FIG. 3, the inner air temperature sensor 39 is arranged in a suitable location inside the cabin 100 for detecting an air temperature $T_r$ in the cabin 100 (inside air temperature) so as to provide an electric signal indicative thereof. The outer air temperature sensor 40 is arranged at a suitable location on the body of the vehicle, capable of contacting with air outside the cabin so as to produce an electric signal indicating the outside air temperature $T_{am}$. The engine cooling water sensor 41 is arranged on the body of the internal combustion engine (not shown) so as to contact with the engine cooling water in a water jacket so as to provide electric signal indicative of a temperature $T_w$ of an engine cooling water. The sun radiation sensor 42 is formed as a photo-diode, the value of the electric resistance of which varies upon a receipt of sun radiation, and issues an electric signal indicative of a sun radiation amount Ts introduced into the cabin. Finally, the after-evaporator temperature sensor 43 is arranged at a location 43-1 immediately downstream form the evaporator 4 so as to provide an electric signal indicative of the temperature Te of the air at the outlet of the evaporator 4. The above-mentioned temperature sensors, the inside air temperature 39, the outside air temperature sensor 40, the engine cooling water temperature sensor 41 and the after-evaporator sensor 43, are constructed as thermistors, and the values of electric resistance of the thermistors vary in accordance with the temperatures.

Now, a calculation of a target value $\theta_0$ of the degree of opening of the air mix damper 28 is explained. When an automatic air conditioning mode is selected by pushing the switch 81 on the instrument panel 70 in FIG. 4, the CPU 31 first calculates, the target value $T_{ao}$ of the temperature of the air discharged to the cabin 100. This valve is calculated from the set temperature $T_{set}$, the inside air temperature $T_r$, the outside air temperature $T_{am}$ and the sun radiation amount $T_s$ using the following equation, $$T_{ao}=K_{set}\times T_{set}-K_r\times T_r-K_{am}\times T_{am}-K_s\times T_s+C \qquad (1)$$

where $K_{set}$ is a gain for the setting temperature $T_{set}$ obtained from the temperature set switch 37 on the instrument panel 70, $K_r$ is a constant for the inside air temperature $T_r$ sensed by the inside air temperature sensor 49, $K_{am}$ is a constant for the outside air temperature $T_{am}$ sensed by the outside air temperature sensor 40, $K_s$ is a constant for the solar radiation $T_s$ sensed by the radiation sensor 42, and C is a correction constant.

Next, during the automatic air conditioning mode, CPU 31 calculates from the target discharged air temperature $T_{ao}$, the engine cooling water temperature $T_w$, and the after-evaporator temperature $T_e$, the target value $\theta_0$ of the degree of the opening air mix damper 28 using the following equation.

$$\theta_0 = \frac{T_{ao} - T_e}{T_w - T_e} \times 100(\%) \tag{2}$$

The use of the engine cooling water temperature $T_w$ and the after-evaporator temperature $T_e$ in the calculation of the target value $\theta_0$ of the degree of the opening of the air mix damper 28 are effective for preventing the temperature of the discharged air discharged from being varied even when the engine cooling water temperature $T_w$ as the after-evaporator temperature $T_e$ are changed while maintaining the fixed target value $\theta_0$ of the degree of the opening of the air mix damper 28. However, it should be noted that the water temperature sensor 41 and the after-evaporator sensor 43 have a certain a heat capacity, which causes the response to be delayed, thereby causing the detected temperature to be different from the actual temperature, which should, desirably, be compensated.

Figure 5:
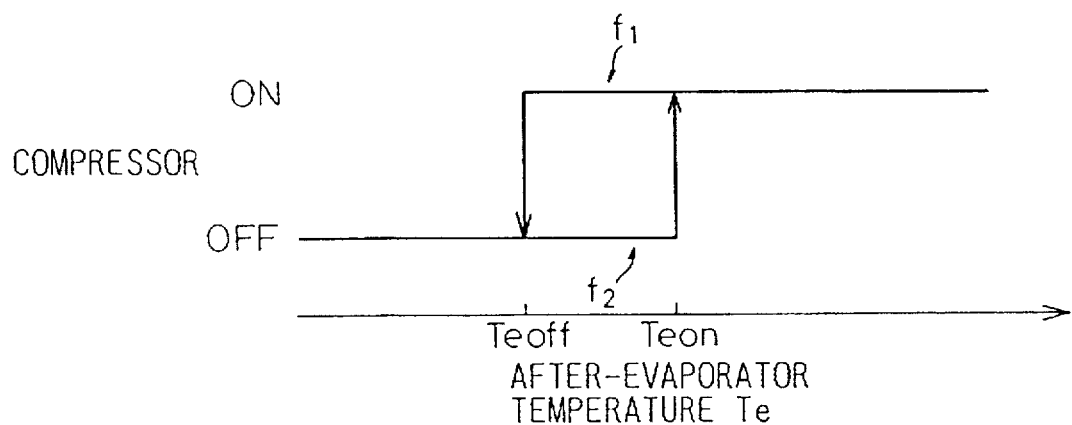
FIG. 5 is an operating characteristic of a compressor during a de-frost mode.

Now, the control of the capacity of the compressor for varying the amount of the recirculated refrigerant for obtaining a frost cut operation will be explained. Namely, a diagram in FIG. 5 illustrates how CPU 31 operates the compressor 23 in the refrigerating circuit for preventing the evaporator 4 from being frosted-up during an automatic air conditioning mode. This diagram is stored in the ROM 32 so that the control of the compressor 23 according to the diagram is obtained. Namely, during the automatic air conditioning mode, entered by the depression of the AUTO switch 81 in FIG. 4, a reduction (an arrow $f_1$ in FIG. 5) of the after-evaporator temperature $T_e$ as detected by the sensor 43 lower than a predetermined value $T_{eoff}$ of, for example, a value 3° C. causes the electromagnetic clutch in the compressor 23 to be disengaged, thereby stopping the latter. As a result, a recirculation of the refrigerant in the refrigerating circuit is stopped, thereby reducing the cooling capacity of the evaporator 4. Such a reduction of the cooling capacity causes the after-evaporator temperature $T_e$ to increase. The increase (an arrow $f_2$ in FIG. 5) of the after-evaporator temperature $T_e$ larger than a predetermined value $T_{eon}$ of, for example, a value 4° C. causes the electromagnetic clutch in the compressor 23 to be engaged, thereby the latter to be operated. As a result, a recirculation of the refrigerant in the refrigerating circuit is again commenced, thereby increasing the cooling capacity at the evaporator 4. Such an increase in the cooling capacity causes the after-evaporator temperature $T_e$ to be reduced.

Now, control of the degree of the opening of the air mix damper 28 for correcting the target opening $\theta_0$ executed by the CPU 31 will be explained. Namely, CPU 31 determines from the signal from the drive circuit 35 (FIG. 3) that the compressor 23 is switched from an operated condition to a non-operated condition or that from the non-operated condition to the operated condition. Furthermore, a change in the after-evaporator air temperature $T_e$ is acquired by the CPU 31. Then, an estimation of an actual cooling capacity at the evaporator 4 is carried out from various input data, including the ON or OFF condition of the compressor 23, the target temperature $T_{eon}$, when the compressor is made ON, the temperature $T_e$ of the air at the outlet of the evaporator 4 by the sensor 43, a change in the value of the detected value of the temperature $T_e$ per unit of time, f ($=T_e$/sec), and a temperature $T_{ein}$ of the air at the inlet of the evaporator 4, which can be detected directly by a sensor arranged at the location immediately upstream from the evaporator 4 or detected indirectly using a temperature sensor located at a different place. Furthermore, the CPU 31 determines values in percent of correction amount $\Delta\theta_n$, based on a difference in behavior between the detected after-evaporator temperature Te and the estimated after-evaporator temperature. Finally, a target value $\theta_0(\%)$ of the degree of the opening of the air mix damper after the consideration of the determined correction amount $\Delta\theta$ is calculated by the following equation.

$$\theta_0 = \theta_0 + \Delta\theta \tag{3}$$

In the above embodiment, at a sub-routine C, explained later, for executing the correction of the degree of the opening, the value of the evaporator inlet temperature $T_{ein}$, the value of the outside air temperature $T_{am}$ from the outside air temperature sensor 40 during the outside air inlet mode obtained from the position 9A of the damper 9 in FIG. 3, and the value of the inside air temperature $T_r$ from the inside air temperature sensor 39 during the inside air inlet mode obtained by the dotted position 9B of the damper 9 in FIG. 3 can be, respectively, used. In order to obtain the value of $T_{ein}$, it is, of course, possible to actually provide a sensor for detecting the temperature at the inlet of the evaporator 4.

The CPU 31 issues to the servo-motor 29 a signal indicative of the corrected value of the target degree of the opening $\theta_0$ of the air mix damper 28, so that the actual degree of the opening of the air mix damper 28 is controlled to the target value $\theta_0$ including correction amount $\Delta\theta$. When the air conditioning system is of a type provided with independent ducts for the driver and the passenger seats, a temperature difference in the discharged air to the cabin can be created between the left and right ducts in accordance with various environmental factors including the sun radiation amount.

Figure 6:
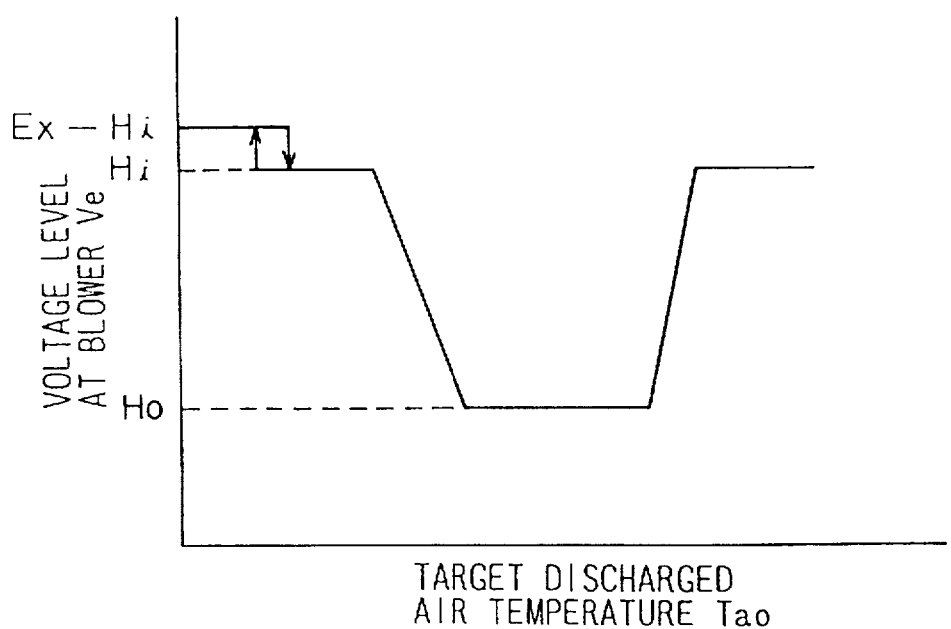
FIG. 6 shows a relationship between a setting of a target discharged air temperature and a voltage level at an blower motor.

Control of the blower 3 by the CPU 31 will, now, be explained. FIG. 6 illustrates, with respect to a target value $T_{ao}$ of the discharged air temperature, a setting of a voltage in the blower motor 21. The target value $T_{ao}$ of the discharged air temperature becomes low during a summer season where the outside air temperature is high, and becomes high during a winter season where the outside air temperature is low. The voltage level applied to the blower motor 21 is controlled to the setting stored in the memory and as shown in FIG. 6, when a condition is obtained that the temperature of the engine cooling water $T_w$ detected by the sensor 41 is higher than the predetermined value of, for example, 75° C. In the characteristic shown in FIG. 6, the voltage setting is such that it attains the maximum value $H_i$ in a high or low temperature range where the target temperature of the discharged air is low or high, and attains the minimum value in a medium range where the temperature is medium. Furthermore, in the transient range from the low temperature range to the medium temperature range or from the medium temperature range to the high temperature range, the voltage level changes along a straight line from the maximum value $H_i$ to the minimum value $H_0$, or from the minimum value $H_0$ to the maximum value $H_i$. The CPU 31 controls the blower drive circuit 20 to obtain the voltage setting as shown in FIG. 6. When an air amount selecting switch 76, 77 or 78 is operated during the automatic air conditioning mode, the voltage corresponding to the selected switch 76, 77 or 78 overrides the automatic setting in FIG. 6. Thus, the CPU 31 issues an instruction for causing the blower motor 21 to be supplied with the fixed electric voltage at the level corresponding the selected switch 76, 77 or 78. It should be noted that the setting of the voltage $V_e$ of the blower can be varied in accordance with the mode selected from various modes such as the upper outlet mode, the bi-level mode and the lower outlet mode.

Operation of First Embodiment

Figure 7:
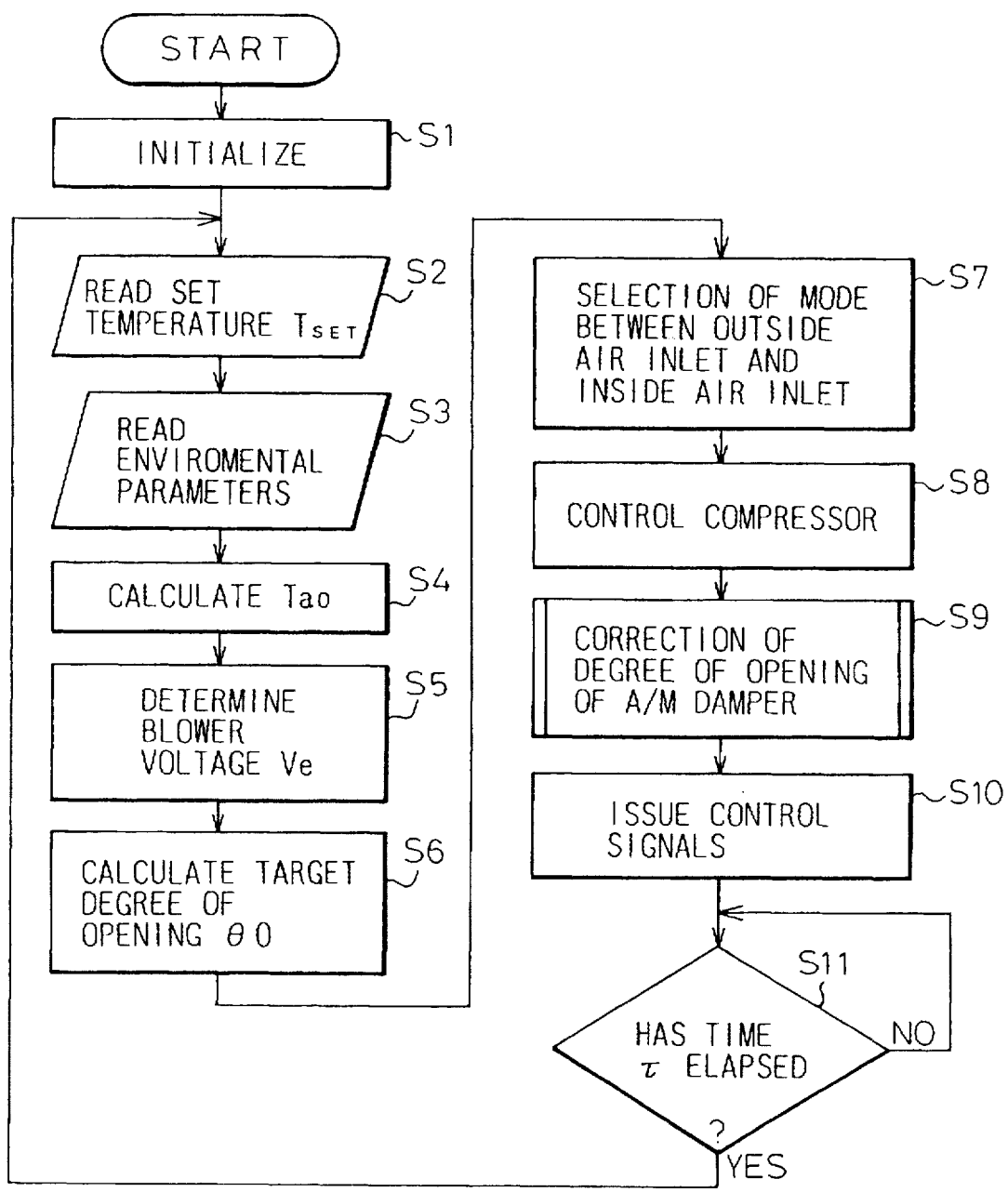
FIG. 7 is a general flow chart illustrating how the system in FIG. 3 operates.

Now, an operation of the control circuit 6 realized by programs stored in the memory (ROM 32) will be explained with reference to flow charts. When an ignition switch (not shown) of the internal combustion engine is made ON, a program as shown in FIG. 7 is commenced. At step S1, various flags including a condition flag SBR, a correction control flag FLG, various timers, and other variables are initialized. At step S2, a set temperature $T_{set}$ by the temperature set switch 37 on the instrument panel 70 is read out and stored in the designated area of the memory (RAM 33). At step S3, various environmental parameters of the vehicle are read out from the respective sensors. Namely, the inside air temperature $T_r$ detected by the sensor 39, the outside air temperature $T_{am}$ detected by the sensor 40, the engine cooling water $T_w$ detected by the sensor 41, the sun radiation amount $T_s$ detected by the sensor 42 and the after-evaporator temperature $T_e$ detected by the sensor 43 are input and stored to the designated areas of the memory (RAM 33).

At step S4, based on the data $K_{set}$, $T_{set}$, $K_r$, $K_{am}$ and C, the target value $T_{ao}$ of the temperature of the air discharged to the cabin 100 is calculated using the above mentioned equation (1).

At step S5, based on the target value $T_{ao}$ of the temperature of the air discharged to the cabin calculated at the step S4, a value of the voltage $V_e$ of the blower operating signal is calculated using the diagram shown in FIG. 6 stored in the memory. Namely, the memory (ROM 32) includes a data map between the values of the $T_{ao}$ and the value of the $V_e$ corresponding the curve in FIG. 6. An interpolation is done to obtain a value of the voltage $V_e$ corresponding to the calculated value of $T_{ao}$.

At step S6, based on the calculated target value $T_{ao}$ of the discharged air temperature, and the detected values of the cooling water temperature $T_w$ detected by the sensor 41 and of the after-evaporator temperature $T_e$ detected by the sensor 43, a target value of the degree of the opening $\theta_0$ of the air mix damper 28 is calculated using the above-mentioned equation (2).

At step S7, a selection of a mode from the outside air inlet mode and the inside air inlet mode is generally illustrated, which is done based on the calculated value of the discharged air temperature $T_{ao}$ calculated at the step S4. After the selection is done, a signal is issued to the servo motor 10 so that a desired position of the switching damper 9 matched to the selection is obtained between the position 9A for the outside air introduction via the outside air inlet 8 and the position 9B for the inside air introduction via the inside air inlet 7.

At the following step S8, a routine for operating the compressor 23 is generally illustrated, which is done in accordance with the characteristic as shown in FIG. 5 or the condition (ON or OFF condition) of the air conditioning switch 80 on the instrument panel 70 in FIG. 4, so that a desired control (ON or OFF control) of the electro-magnetic clutch (not shown) for connecting the crankshaft of the internal combustion engine with the compressor is obtained.

At the following step S9, a routine is generally illustrated for executing a control of the degree of the opening of the air mix damper 28 just after the compressor 23 is energized or de-energized.

At the following step S10, signals obtained at steps S5 to S9 are issued to the blower drive circuit 20, the servo motors 10 and 29, and the compressor drive circuit 35, etc., so that desired control of the blower 3, the air inlet switching damper 9, the air mix damper 28 and the compressor is obtained.

At the final step S11, it is determinated, if a predetermined cycle time τ of a value of, for example, 1 to 4 seconds has elapsed since the preceding execution of the step S10. When it is determined that the predetermined time (a cycle time τ) has not yet lapsed, the routine enters into a waiting loop. When the predetermined time has lapsed (yes result at the step S11), the routine goes to step S2 to repeat the steps S1 to S10, thereby obtaining an automated control of the air conditioning system for the automobile.

Now, a detail of the routine S9 for executing a control of the degree of the opening of the air mix damper 28 just after the energizing or de-energizing of the compressor 23 will be explained with reference to a flowchart in FIG. 8. At step S21, a determination is made if a switching of the compressor from the non-operating or OFF condition to an operating condition or ON condition exists between the preceding cycle and this cycle. Namely, a determination is made that the state of the detection signal at the compressor drive circuit 35 is switched from the state corresponding to the OFF condition of the clutch to the ON condition of the clutch. A negative determination of an occurrence of a switching of the compressor from the non-operated condition to the operated condition at the step S21 causes the routine directly to flow into a step S25. Contrary to this, a positive determination of an occurrence of a switching of the compressor from the non-operating condition to the operating condition at the step S21 causes the routine to flow into a step S22, where it is determined that the duration $T_{off}$ measured by a timer TIMER is larger than a predetermined value $T_\alpha$. This determination at the step S22 is for discrimination between a state which is obtained by an ON condition of the compressor caused by a manual depression of the A/C switch 80 on the panel 70 for entering into the air conditioning operation and a state which is obtained by an automatic ON operation of the compressor 23 during the defrosting operation as explained with reference to FIG. 5. When it is determined that $T_{off} \geq T_\alpha$, i.e., a time longer than the predetermined value has elapsed since the previously OFF condition, the means that the ON condition was obtained by the manual depression of the A/C switch 80. In this case, the routine goes to step S23, where a conditional flag SBR is set to 1, and the TIMER is cleared to 0, and the control flow goes to step S25. When it is determined that $T_{off} < T_\alpha$, i.e., a time longer than the predetermined value has not yet elapsed, this means that the ON condition of the compressor was obtained by automatic ON signal $T_{eon}$ (FIG. 5) of the compressor 23 during the defrosting operation. In this case, the routine goes to step S24, where a conditional flag SBR is set to 4, and the TIMER is cleared to 0, and the control flow goes to step S25.

At step S25, it is determined if the compressor has switched from the operating or ON condition between the preceding cycle and this cycle. Namely, it is determined if the state of the detection signal at the compressor drive circuit 35 has switched from the state corresponding to the ON condition of the clutch to the OFF condition of the clutch. A negative determination of an occurrence of a switching of the compressor from the operating condition to the non-operating condition at the step S25 causes the routine to go directly to step S29. Contrary to this, a positive determination of an occurrence of a switching of the compressor from the operating condition to the non-operating condition at the step S25 causes the routine to go to step S26, where it is determined if the switching OFF of the compressor 23 at the step 25 is caused by the manual depression of the OFF switch on the panel 70. In other words, at the step 26, it is determined if the switching off of the compressor 23 is not caused by the automatic off signal $T_{\mathit{off}}$ during the defrosting operation. When it is determined that a switching from the ON condition to the OFF condition occurs due to the manual depression of the switch by the passenger, the routine goes to step S27, where a conditional flag SBR is set to 3. When it is determined that the switching from the ON condition to the OFF condition did not occur due to the manual depression of the switch by the passenger, this means that the switching off of the compressor 23 is caused by the defrosting operation as illustrated with reference to FIG. 5 for preventing the evaporator from being frosted. In this case, the routine goes to step S28, where a conditional flag SER is set to 2.

Figure 8:
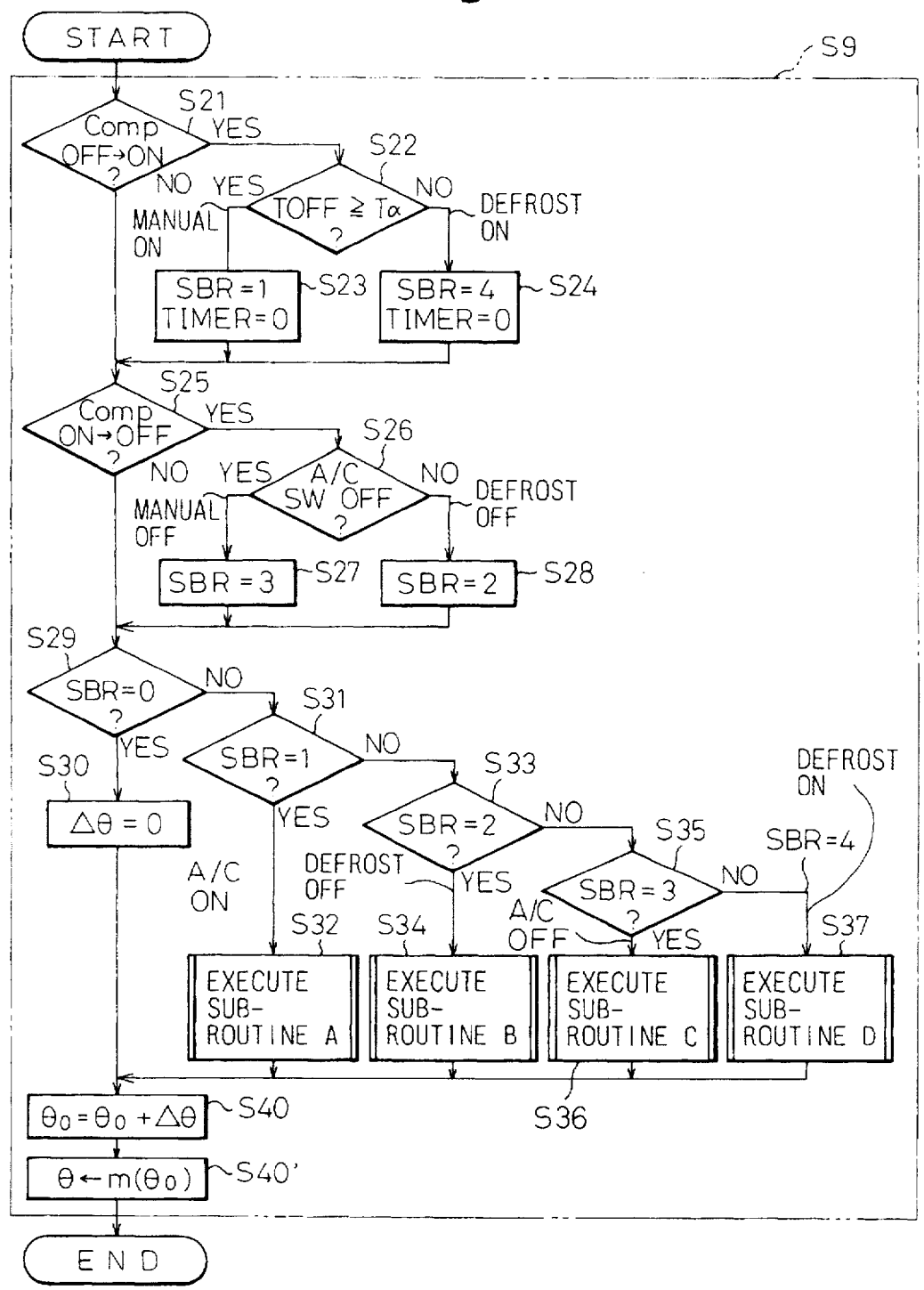
FIG. 8 is a flowchart illustrating a detail for correction of the degree of opening of the air mix damper in FIG. 7.

In short, as a result of the execution of the steps S21 to S24 in FIG. 8, the setting of the conditional flag SBR is varied in accordance with the duration time $T_{\mathit{off}}$ of OFF condition of the compressor 23. The reason for such a setting of the conditional flag SBR is as follows. Namely, FIG. 9A illustrates that the compressor 23 is, after a sufficiently prolonged OFF condition, made ON, and then repeatedly made ON and OFF due to the execution of the defrosting operation (FIG. 5). FIGS. 9B, 9C and 9D illustrate how, in response to the change in the condition of the compressor in FIG. 9A, the discharge air temperature, the after-evaporator temperature and an actual value Tp of the degree of the opening of the air mix damper 28 vary. In FIG. 9C, a solid curve shows an actual value of the temperature TE at the outlet of the evaporator 4, corresponding to an actual value of the cooling capacity of the evaporator 4, while a dotted curve shows the detected value Te of the after-evaporator sensor 43, corresponding to the detected cooling capacity of the evaporator 4. The switching of the compressor 23 from the prolonged OFF condition to the ON condition at time $t_1$ causes the actual temperature TE at the outlet of the evaporator 4 to be reduced as shown by the solid curve in FIG. 9C with a short delay of about 2 to 3 seconds. However, as to the detected temperature $T_e$ at the after-evaporator sensor 43, a reduction of its value does not occur for a few tens of seconds due to a delay in the response of the sensor 43 (or time constant), which is inevitably caused by the thermal capacity of the thermistor constructing the sensor 43. A test conducted by the inventors has affirmed that a similar tendency in the actual after-evaporator temperature TE and the detected after-evaporator temperature $T_e$ is obtained in different environmental conditions.

Namely, upon switching on of the compressor 23 from a prolonged and sufficient OFF condition at time t1, a change in the detected after-evaporator temperature $T_e$ just after the switching ON is delayed with respect to the change in the actual after-evaporator temperature TE, so that a change in the actual degree Tp of the opening of the air mix damper 28 is correspondingly delayed, as shown in a curve x in FIG. 9D. As a result, the behavior obtained is that, irrespective of a constant target value Tao of the discharged air temperature, just after the switching, the temperature of the discharged air into the cabin is reduced as shown by a curve y in FIG. 9B, and an increase y' in the temperature of the discharge air in FIG. 9B commences when the degree Tp of the opening of the air mix damper 28 reaches the desired value as shown in a line x'. It can, thus, be predicted that a correction of the actual degree Tp of the opening of the air mix damper 28 in the direction HOT for increasing the discharged air temperature should be done by considering not the target value $\theta_0$ of the opening but the delay in the response of the after-evaporator sensor 43. Contrary to this, when the compressor 23 is switched to the OFF condition after prolonged ON condition at time t2 due to a commencement of the defrosting operation, it can also be predicted that a correction of the actual degree Tp of the opening of the air mix damper 28 in the direction COOL for reducing the discharged air temperature should be done by considering not the target value $\theta_0$ of the opening but the delay in the response of the after-evaporator sensor 43.

Furthermore, when the ON and OFF conditions of a short duration are repeated at times t3 to t6 as a result of the execution of the defrosting operation, the actual evaporator outlet temperature TE continues its increase for a short time, and then, is reduced. Furthermore, the change in the detected value of the after-evaporator temperature $T_e$ by the sensor 43 is further delayed with respect to the actual evaporator outlet temperature TE. A test conducted by the inventors has also confirmed that a similar tendency in the actual after-evaporator temperature TE and the detected after-evaporator temperature $T_e$ is obtained in different environmental conditions. Namely, when ON and OFF conditions of a short duration are repeated during the execution of the defrosting operation, a phase difference of the evaporator outlet temperature $T_e$ detected by the sensor 43 occurs with the detected signal of the switching of the compressor 23 by the compressor driving circuit 35. Thus, according to the present invention, in order to obtain a desired control, an estimation of the actual temperature at the outlet of the evaporator is, first, done based on the result of the determination of the operating condition of the compressor 23 and a result of a phase difference between the detected evaporator outlet temperature $T_e$ by the sensor, and, then, a correction to the target value $\theta_0$ of the air mix damper 28 is done based on the estimated evaporator outlet temperature.

Next, subroutines executed in accordance with the value of the conditional flag SBR will be explained. Again in FIG. 8, at step S29, it is determined if the value of the flag SBR is 0. The determination that SBR=0 means that a change in the condition of the compressor between the ON and OFF states did not occur, so that any correction of the target degree $\theta_0$ of the opening of the air mix damper 28 is not necessary. Thus, the routine flows into step S30, where a correction value $\Delta\theta$ of the degree $\theta_0$ of the opening of the air mix damper 28 becomes zero.

When it is determined that the flag SBR is not zero at step S29, i.e., the correction routine of the air mix damper opening after the switching of the compressor, the routine goes to step S31, where it is determined that SBR=1. The result of the determination that SBR=1 means that the switching-on of the compressor 23 is done after a sufficiently long duration of the OFF state by the manual operation of the A/C ON switch 80, and the routine goes to a subroutine S32 for executing a correction of the degree of the opening of the air mix damper 28. A detail in the subroutine A will now be explained with reference to a timing chart in FIGS. 10A to 10D and a flow chart in FIG. 11.

Figures 10A, 10B, 10C, 10D:
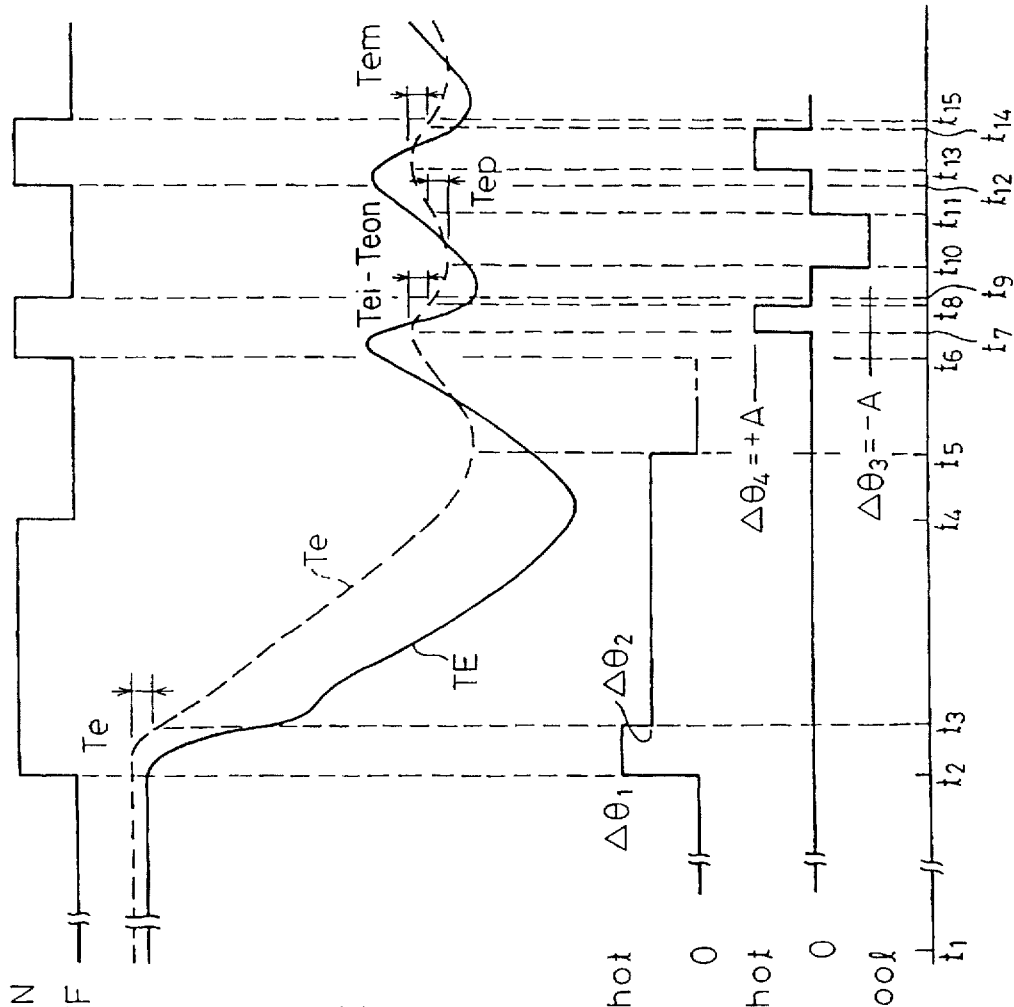
FIGS. 10A to 10D are time charts illustrating an operation of compressor, an after-evaporator temperature, a correction amount of the degree of the opening of the air mix damper at a first phase, and a correction amount of the degree of the opening of the air mix damper at a second phase, respectively, during a transient state after the switching ON of the compressor.

In FIG. 10A, at time $t_1$, the compressor 23 is turned OFF, and, after this OFF condition is prolonged for a sufficiently long time, at time $t_2$, the compressor 23 is turned ON by the A/C ON switch 80. A reduction in the actual evaporator outlet temperature TE is commenced immediately at time $t_2$, while a reduction of the detected evaporator outlet temperature $T_e$ by the sensor is commenced at a time $t_3$. Namely, the period between times $t_2$ and $t_3$ is a dead time, since the sensor detected value $T_e$ is unchanged irrespective of the switching ON of the compressor. At time $t_4$, the compressor 23 is turned OFF due to the commencement of the defrosting operation (FIG. 5). In the period between times $t_3$ and $t_4$, a change in the detected temperature $T_e$ follows the change in the actual temperature TE irrespective of an existence of the delay time therebetween.

In view of the above, a behavior of the detected temperature $T_e$ with respect to the actual temperature TE is different between the dead period ($t_2$ to $t_3$) and the tracking period ($t_3$ to $t_4$). In this case, the curve of the change in the actual after-evaporator temperature TE is determined by the difference of the value of TE just before the switching ON of the compressor 23 with respect to the target value $T_{eon}$ of the after-evaporator temperature when the compressor is switched ON, of a value, for example, between 3° to 4° C. as explained with reference to FIG. 5. In other words, during the dead period in the response of the sensor value $T_e$ between times $t_2$ and $t_3$, a correction while estimating an actual temperature can be done from the difference between the detected value just before switching ON and the target value as obtained at the switching ON. Namely, during the period between times $t_2$ and $t_3$, the target degree of the opening $\theta_0$ of the air mix damper 28 is corrected in the direction HOT for increasing the discharged air temperature for an amount $\Delta\theta_1$, as shown by FIG. 10C, which amount is determined in accordance with the difference between the detected after-evaporator temperature $T_{e1}$ just before the switching ON of the compressor 23 and the target value $T_{eon}$ of the after-evaporator temperature upon the switching ON of the compressor 23. In other words, the correction amount $\Delta\theta_1$ is considered as an estimated after-evaporator temperature estimated from the difference of the detected after-evaporator temperature $T_{e1}$ just before the switching ON of the compressor 23 from the target value $T_{eon}$ of the after-evaporator temperature upon the switching ON of the compressor 23. It should be noted that, as shown in FIG. 10B, the value of the actual after-evaporator temperature TE is equal to the detected after-evaporator temperature $T_e$ before switching on of the compressor 23. Thus, the value $T_{e1}$ may be used for the estimation purpose.

At the period between times $t_3$ and $t_4$, the detected value $T_e$ tracks the actual value TE with a delay. Thus, a correction while estimating actual temperature TE can be done by a change of the value of the detected value $T_e$. Namely, a correction of the target value of the degree of the opening $\theta_0$ of the air mix damper 28 in the direction HOT for increasing the discharged air temperature is done for an amount $\Delta\theta_2$, as shown in FIG. 10C, which amount is determined in accordance with a change in the detected after-evaporator temperature $T_e$ by the after-evaporator sensor 43 per unit of time, which corresponds, for example, to a control cycle $\tau$ of the CPU 31 which is a value in a range between 1 to 4 seconds. In other words, the correction amount $\Delta\theta_2$ is considered as an estimated after-evaporator temperature estimated from the change in the value of the detected after-evaporator temperature by the after-evaporator sensor 43 per unit of time.

In short, according to the present invention, even if the cooling capacity of the evaporator is rapidly changed due to switching the compressor ON from a prolonged OFF condition by entering into the air conditioning operation, the temperature of the air discharged into the cabin can be prevented from varying.

Figure 11:
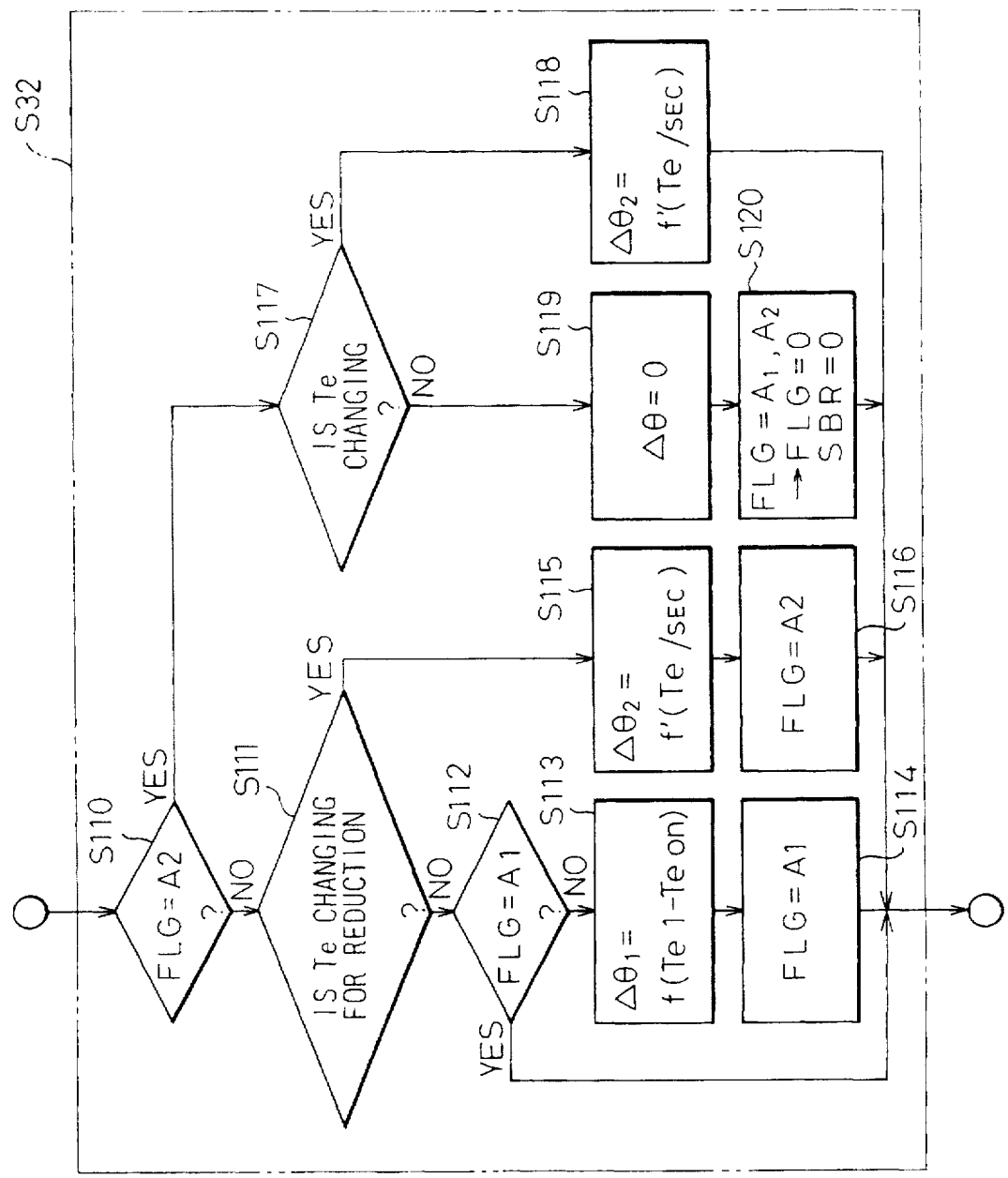
FIG. 11 is a flow chart of a sub-routine A in FIG. 8.

Now, the operation of the control system according to the present invention for executing the control in FIGS. 10A to 10D will be explained with reference to the flowchart in FIG. 11. At step S110, it is determined that if a flag FLG is set to A2. If the FLG is not A2, the routine goes to step S111, where it is determined if the after-evaporator temperature sensed by the sensor 43 is changing in a direction for reduction of its value, i.e., the value of this cycle ($T_e(i)$) is smaller than the value of the preceding cycle ($T_e(i-1)$). A no determination at step S111 means that the after-evaporator temperature sensed by the sensor 43 is not changing in a direction for reduction of its value irrespective of the fact that the compressor 23 is turned ON to increase the evaporating capacity. Namely, the system is in the dead period $t_2$ to $t_3$ in FIG. 10B. In this case, the routine goes to a step S112, where it is determined that the flag FLG is set to A1, i.e., the correction control of the target degree of the opening $\theta_0$ of the air mix damper 28 for the dead period ($t_2$ to $t_3$ in FIG. 10B) is executed. When it is determined that FLG is A1, the following steps S113 and S114 are by-passed. When it is determined that FLG=0, i.e., the correction control of $\theta_0$ for the dead period ($t_2$ to $t_3$ in FIG. 9) is not yet commenced, the routine flows into step S113, where the correction amount $\Delta\theta_1$ is calculated by the following equation.

$$\Delta\theta_1 = f(T_{e1} - T_{eon}) \qquad (4),$$

where the equation (4) means that the $\Delta\theta_1$ is determined as a function f of the difference $T_{e1} - T_{eon}$. Namely, the memory is provided with a map of values of the correction amount $\Delta\theta_1$ with respect to values of the difference $T_{e1} - T_{eon}$, and a map interpolation is carried out for obtaining a value of $\Delta\theta_1$ corresponding to a value of the $T_{e1} - T_{eon}$. Then, the routine goes into step S114, where flag FLG is set to A1.

When it is determined, at step S111, that the after-evaporator temperature $T_e$ sensed by the sensor 43 is changing in a direction for reducing its value, i.e., the system is now in the tracking period ($t_3$ to $t_4$ in FIG. 10B), the routine goes to step 115 where the correction amount $\Delta\theta_2$ is calculated by the following equation.

$$\Delta\theta_2 = f'(T_e/\text{sec}) \qquad (5),$$

where the equation (5) means that the $\Delta\theta_2$ is determined as a function f' of the change of the detected after-compressor temperature $T_e$ per unit of time (slope of the change of $T_e$). Then, the routine goes into step S116, where flag FLG is set to A2.

When it is determined, at step S110, that the flag FLG is A2, i.e., the correction values $\Delta\theta_1$ as well as $\Delta\theta_2$ are already set, the routine goes to step S117, where it is determined that a reduction in the value of the detected after-evaporator temperature $T_e$ is continuing, i.e., an absolute value of the difference between the value of this cycle $T_e(i)$ and the value of the preceding cycle $T_e(i-1)$ larger than a predetermined value a. A yes result at step S117 means that the reduction of the detected after-evaporator temperature is continuing, i.e., the system is under the tracking period ($t_3$ to $t_4$ in FIG. 10). Thus, the routine flows into step S118, which is the same as the step S115, so that the calculation of the correction amount $\Delta\theta_2$ by the above equation (5) continues.

When it is determined, at step S117, that the change in the after-evaporator temperature is not larger than the predetermined value, i.e., the tracking phase between t3 to t4 is ended, the routine goes to step S119, where the correction amount Δθ is made zero, and, then, to step S120, where the conditional flag FLG is, from the value of A1 or A2, cleared to 0, and the flag SBR is also cleared to 0.

Now, returning to the flowchart in FIG. 8, if the result of the determination at the step S31 is that the SBR is not 1, the routine goes to step S33, where it is determined that SBR=2, i.e., the OFF condition of the compressor 23 is obtained by the automatic defrosting operation (FIG. 5) provided in the air conditioning system. In this case, the OFF condition of the compressor 23 is obtained after a short ON condition. A yes determination at the step S33 causes the routine to go to step S34, where a sub-routine B for correcting the degree of opening of the air mix damper 28 is done.

Now, the operation of the sub-routine B will be explained with reference to the flow chart in FIG. 12 and the timing charts in FIGS. 10A to 10D. As shown in FIG. 10A, when the compressor 23 is switched from the OFF condition, after a short time, to ON condition at time $t_9$ or $t_{15}$, the actual after-evaporator temperature TE continues to fall for a while irrespective of the OFF condition of the compressor and then begins to increase. The detected after-evaporator temperature $T_e$ tracks the actual evaporator-after temperature TE as shown in a period between times $t_9$ to $t_{12}$, although the detected temperature $T_e$ is slightly delayed with respect to the actual temperature TE. Although the actual value TE cannot, of course, be known directly, the particular change in the detected value $T_e$ makes it possible to estimate a necessary correction in accordance with the actual value TE. For example, the time $t_{10}$, where an increase in the detected temperature $T_e$ commences can be known and is in the period where the correction is necessary. Namely, in the embodiment, in the case where, after the compressor 23 has been on for a short duration, the compressor 23 is again turned OFF, the degree of the opening of the air mix damper 28 is corrected in the direction COOL to reduce the temperature of the discharged air for an amount $\Delta\theta_3$ (=−A) for a period which starts when the detected after-evaporator temperature $T_e$ commences its increase at time $t_{10}$ and which ends when the detected after-evaporator temperature $T_e$ is increased by a predetermined value $T_{ep}$ at time $t_{11}$. Namely, the correction amount $\Delta\theta_3$ is an estimated correction amount which is estimated from a change in the operating condition, i.e., the cooling capacity of the evaporator 4, of the compressor 23 and a change in the detected after-evaporator temperature $T_e$ by the after-evaporator sensor 43.

Figure 12:
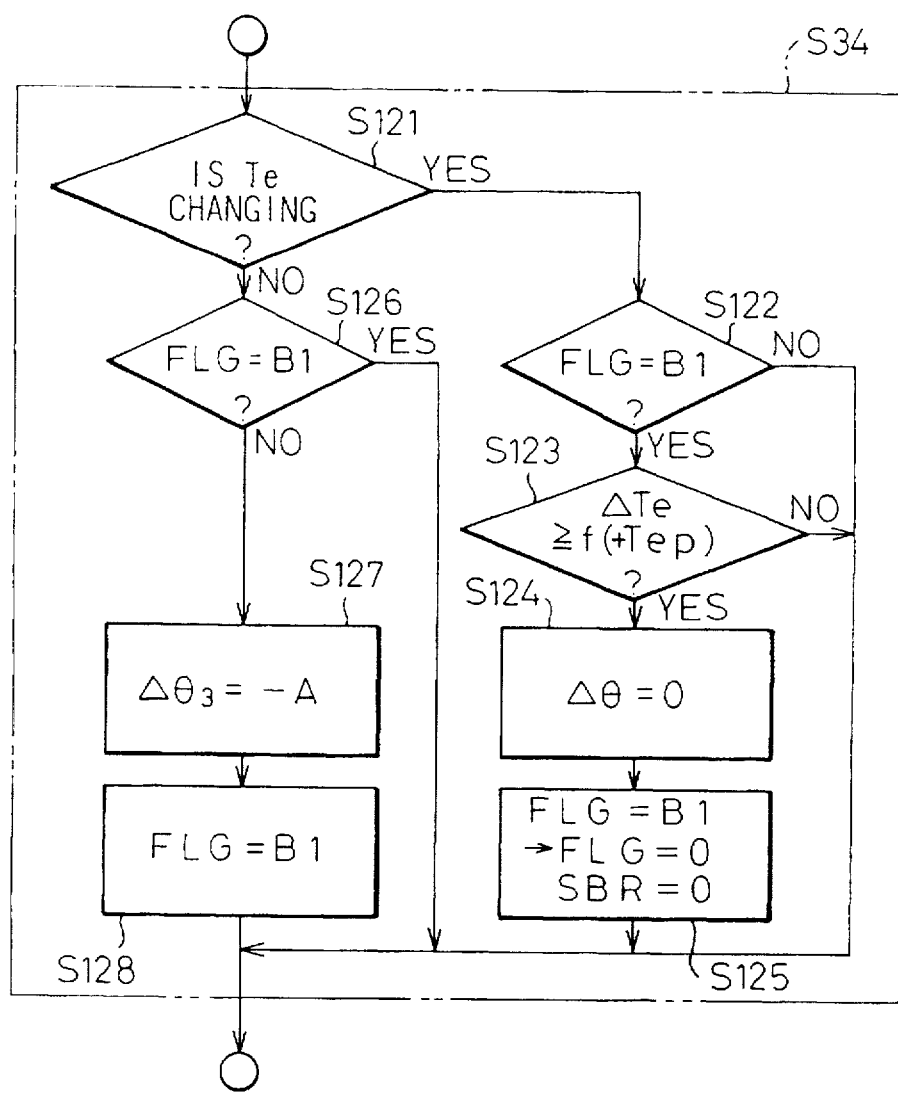
FIG. 12 is a flow chart of a sub-routine B in FIG. 8.

FIG. 12 is a flowchart illustrating a detail of the subroutine B. Namely, at step S121, it is determined if the value of the detected after-evaporator temperature $T_e$ is changing. This determination is done when an absolute value of a difference between the value of this cycle $T_e(i)$ and the value at the preceding cycle $T_e(i-1)$ is smaller than a predetermined value. When it is determined that the detected value of the after-evaporator temperature is not varied, i.e., the system is at a point corresponding to time $t_{10}$ in FIG. 10B, the routine goes to a step S126, where it is determined that a flag FLG is set to B1. A determination that the FLG is not B1 means that this is the first cycle for the commencement of the correction for this period. The routine flows to step S127, where the correction $\theta_3$ of the degree of the opening of the air mix damper 28 is set in the direction COOL for reducing the discharged air temperature for the amount −A. Then the flag FLG is set to B1.

A yes determination at the step S121 means that the detected after-evaporator temperature $T_e$ is changing. Then, the routine goes to step S122, where it is determined that a correction flag FLG is set to B1, i.e., the correction is done. When it is determined that the correction is not done, i.e., the FLG is not B1, the steps below the step S123 are bypassed.

When it is determined that the correction is done, i.e., the FLG is B1, the routine goes to step S123, where it is determined that a difference ΔTe of a value in the direction of the increase larger than a predetermined value $T_{ep}$ of the detected after-evaporator temperature $T_e$ is obtained. The ΔTe is an amount of change in the value from the time (t10 in FIG. 10) where the value of the change in the detected after-evaporator temperature $T_e$ becomes zero or is a value of the change in the detected after-evaporator temperature $T_e$ per unit of the time. When it is determined that the desired amount change in the $T_e$ is still not obtained, the steps below S124 are by-passed, i.e., the correction control is continued.

The continuation of the control of the correction amount causes the increase in the detected after-evaporator temperature $T_e$ to exceed the predetermined value $T_{ep}$, as shown in FIG. 10B at time $T_{11}$. In this case, the routine goes from the step S123 to step S124, where the correction amount θ is made zero, so that the correction is completed, and to a step S125, where the correction FLG and the conditional flag SBR are both cleared to zero.

Returning to the flowchart in FIG. 8, a determination that SBR is not 3 at the step 35 means that the flag SBR=4, i.e., the switching on of the compressor 23 is obtained from the preceding short OFF condition of the compressor, during the defrosting operation in FIG. 5. This causes the routine to go to step S37, where sub-routine D for correcting the degree of the opening of the air-mix damper 28 is commenced. The details of the sub-routine D will be explained with reference to the timing chart in FIGS. 10A to 10D and the flow chart in FIG. 13.

As shown in FIG. 10B, in the period between times $t_{12}$ and $t_{15}$, upon the switching on of the compressor 23 from the preceding short OFF condition of the compressor, the actual after-evaporator temperature TE is increased for a while, and is then reduced. Contrary to this, the detected after-evaporator temperature $T_e$ tracks the change of the actual after-evaporator temperature TE while being delayed. In this case, the actual temperature TE cannot be known. However, the particular change in the detected value $T_e$ makes it possible to estimate the correction. For example, a time $t_{13}$, where a decrease in the detected temperature $T_e$ is commenced, can be known and is in the period where the correction is necessary. Namely, according to this embodiment, in the case where the compressor 23 is, after an OFF condition of a short duration during the defrosting operation, made ON, a correction of the degree of the opening of the air mix damper 28 is done in a direction HOT for increasing the discharged air temperature for the value $\Delta\theta_4$ during a period which starts upon the commencement of the reduction of the detected after-evaporator temperature T3 by the sensor 43 and which ends when a reduction of the detected after-evaporator temperature larger than a predetermined value $T_{em}$ is obtained. The correction amount $\Delta\theta_4$ is a correction value based on an estimated after-evaporator temperature estimated from the change in the operating condition of the compressor 23 (cooling capacity of the evaporator) and a change in the after-evaporator temperature detected by the sensor 43.

Figure 13:
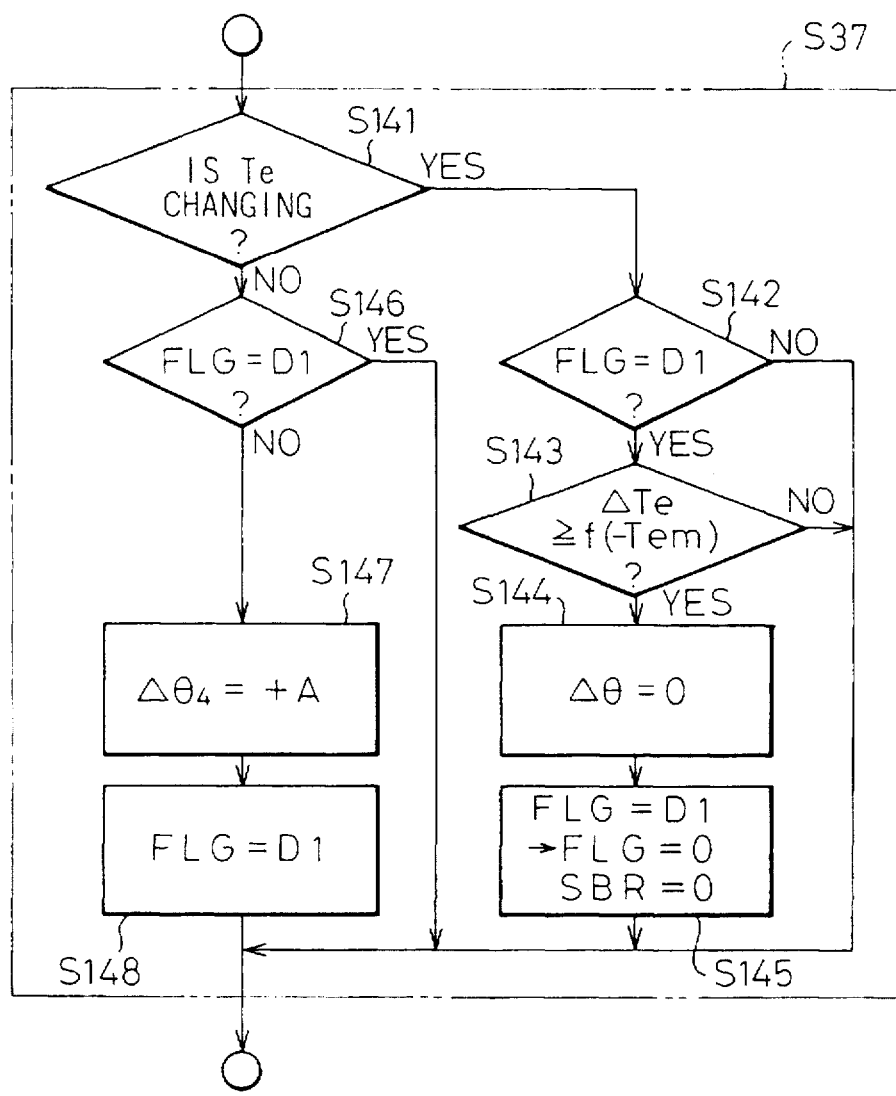
FIG. 13 is a flow chart of a sub-routine D in FIG. 8.

FIG. 13 is a detail of the sub-routine for correcting the degree of the opening of the air mix damper 28. At step S141, it is determined that the value of the detected after-evaporator temperature is changing. When it is determined at step S141 that the detected after-evaporator temperature $T_e$ is not changing, i.e., the system is at the point corresponding to the time $t_{13}$, the routine goes to step S146, where it is determined if the flag FLG is set to D1, i.e., the routine is the first routine after the point of no change in the detected after-evaporator temperature. When it is determined that the flag FLG is already set to D1, the routine below the step S147 is by-passed. When the flag FLG is not yet set to D1, the routine goes to step S147, where the correction amount $\Delta\theta_4$ is set to the predetermined value +A. In other words, the degree of opening of the air mix damper 28 is corrected in the direction HOT for increasing the discharged air temperature. Then, the routine flows into step S148, where the flag FLG is set to D1.

When a determination is obtained at the step S141 that the detected after-evaporator temperature is changing, the routine goes to step S142, where it is determined if FLG is D1, i.e., the correction control is done. When it is determined that FLG is not D1, i.e., the correction control is not done, the routine below the step S143 is by-passed. When it is determined that the FLG is D1, i.e., the correction control is done, the routine goes to step S143, where a reduction in the detected after-evaporator temperature $T_e$ is reduced by a value larger than the predetermined value $T_{em}$. The predetermined value is the value of the change of the detected after-evaporator temperature $T_e$ from the point ($t_{13}$) where the change in the value of the detected after-evaporator temperature $T_e$ is zero, or a change in the $T_e$ per unit of time. When it is determined that a reduction of the $T_e$ larger than the predetermined value is not yet obtained, i.e., the point corresponding to the time $t_{14}$ has not yet arrived, the routine below step S143 is by-passed.

When it is determined that the reduction of the detected after-evaporator temperature $T_e$ larger than the predetermined value $T_{em}$, i.e., the point corresponding to the time $t_{14}$ is reached, the routine goes to step S144, where the correction amount $\Delta\theta$ is cleared, an to step S145, where the flags FLG and SBR are both cleared.

Figure 14A:
FIGS. 14A to 14C are timing charts illustrating an operation of a compressor, an after-evaporator temperature, and a correction amount for the degree of the opening of the air mix damper, respectively, during a transient phase after switching from ON condition to OFF condition.
Figure 14B:
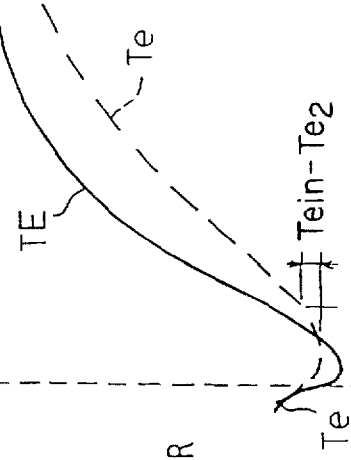
Figure 14C:

In FIG. 8, at step S35, a yes determination (SBR=3) means that the compressor 23 is made OFF not by the defrosting operation but by the manual switching off of the A/C switch on the panel 70 by the passenger. In this case, the compressor is, after a continuation of ON condition for a long time, switched to the OFF condition. In this case, the routine goes to step S36, where a sub-routine C is carried out. Now, details of the sub-routine C will be explained with reference to timing chart in FIGS. 14A to 14C and flow chart in FIG. 15. As shown in the timing chart in FIGS. 14A to 14C, upon the switching from the ON condition to the OFF condition of the compressor by switching off the air compressor switch, the behaviors of the actual after-evaporator temperature TE and the detected after-evaporator temperature $T_e$ are different between a period $t_1$ and $t_2$, and a period $t_2$ and $t_3$. Namely, during the short period just after the switching OFF, referred to below as an opposite phase period, the actual after-evaporator temperature TE falls rapidly, while the detected after-evaporator temperature $T_e$ is substantially unchanged, so that the TE is lower than $T_e$. At the period followed ($t_2$ to $t_3$), the opposite phase period, the actual after-evaporator temperature TE changes more quickly than the detected after-evaporator temperature $T_e$ does, while $T_e$ gradually approaches the TE.

In view of this, according to this embodiment, during the period $t_1$ to $t_2$, the degree of the opening $\theta_0$ of the air mix damper 28 is corrected in the direction COOL for reducing the discharged air temperature for an amount of $\Delta\theta_5$, based on the difference between the detected after-evaporator temperature $T_{e2}$ by the sensor 43 just before switch off of the compressor and the temperature of the air sucked into the evaporator $T_{ein}$ just when the compressor is made OFF. Namely, the $\Delta\theta_5$ is an estimated correction amount estimated from the difference between the detected after-evaporator temperature $T_{e2}$ by the sensor 43 just before the compressor is switched off and the temperature of the air sucked into the evaporator $T_{ein}$ just when the compressor is turned OFF. Between the period $t_2$ to $t_3$, the degree of the opening $\theta_0$ of the air mix damper 28 is corrected in the direction COOL for reducing the discharged air temperature by an amount of $\Delta\theta_6$, based on the change in the value of the detected after-evaporator temperature $T_e$ by the sensor 43 per unit of time corresponding, for example, to the cycle time of the CPU τ, which is a value in a range between 1 to 4 seconds. As a result of such a control, a variation of the temperature of the air discharged into the cabin is reduced due to a rapid change in the cooling capacity of the evaporator caused by a switching off of the compressor from a relatively long duration of the preceding ON condition.

Figure 15:
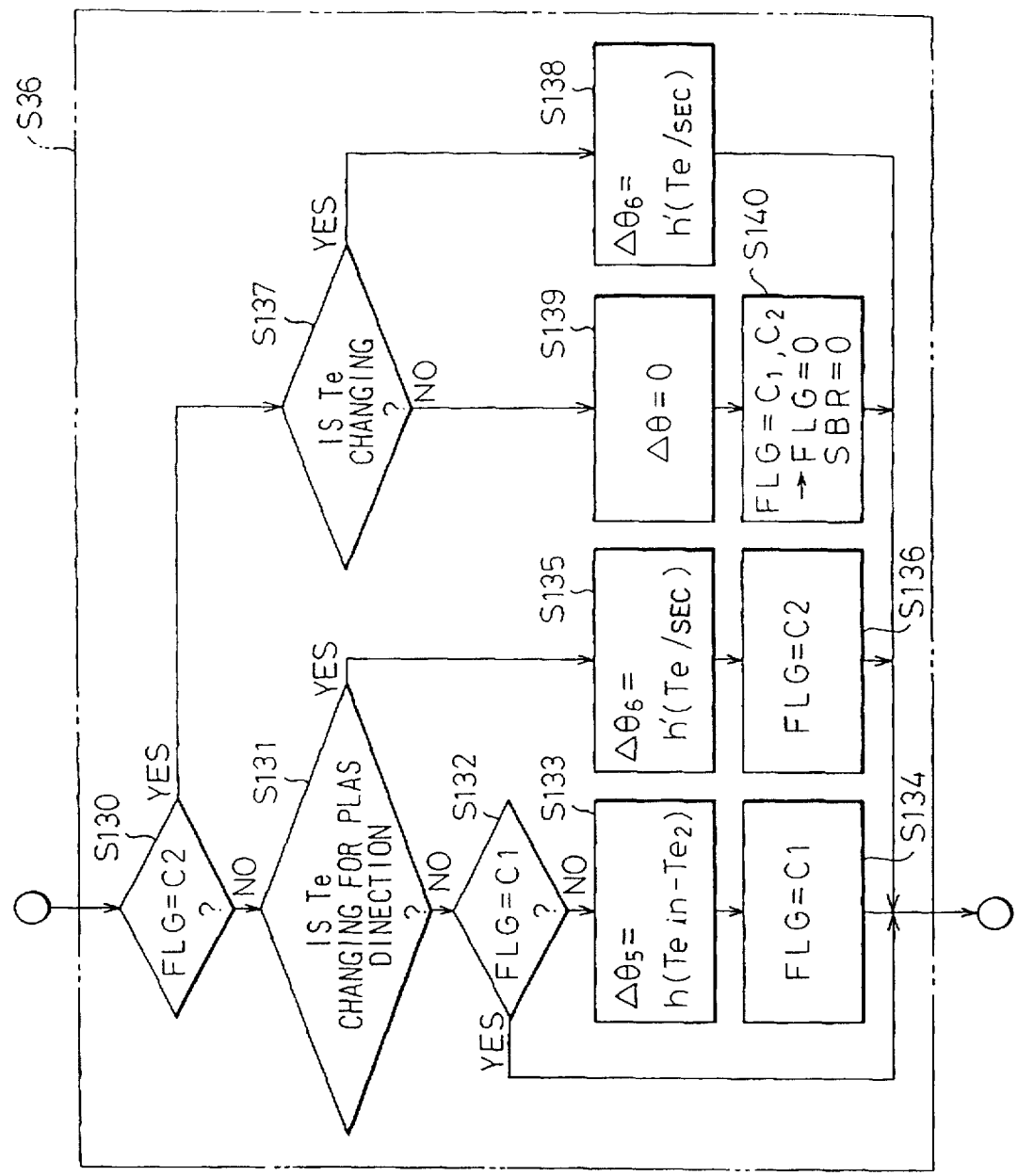
FIG. 15 is a flow chart of a sub-routine C in FIG. 8.

FIG. 15 is a flowchart of the correction sub-routine C. At step S130, it is determined if the correction control flag FLG is set to C2, i.e., the correction routine during the OFF condition of the compressor after a preceding long duration ON condition. When it is determined that the FLG is not C2, i.e., the correction is not being executed, the routine goes to step S131, where it is determined that the value of the detected after-evaporator temperature $T_e$ is varying in the increasing direction. A result of the determination that the value of the detected after-evaporator temperature $T_e$ is not increasing means that, irrespective of the switching to the OFF condition, the value of the $T_e$ is maintained, i.e., the system in under the above-mentioned opposite phase just after the switching. Then, the routine goes to step S132, where it is determined that the correction flag FLG is set to C1. When the flag is not yet set, i.e., the correction routine for the opposite phase between times $t_1$ to $t_2$ in FIG. 14, the routine goes to step S133, where the correction amount $\Delta\theta_5$ is calculated by the following equation (6).

$$\Delta\theta_5 = h(T_{ein} - T_{e2}) \qquad (6),$$

where this equation means that the value of $\theta_5$ is determined as a function h of $T_{ein} - T_{e2}$. Namely, the memory is provided with a map of data of the value of the $\theta_5$ with respect to values of $T_{ein} - T_{e2}$. A map interpolation calculation is done to obtain a value of $\Delta\theta_5$ corresponding to a value of $T_{ein} - T_{e2}$. At a following step S134, the flag FLG is set to C1, which, at the step S132 at the following cycle, causes the routine below the step S133 to be bypassed.

At step S131, when it is determined that the value of the detected after-evaporator temperature is increasing, the routine goes to step S135, where the correction amount $\Delta\theta_6$ is calculated by the following equation (7).

$$\Delta\theta_6 = h'(T_e/\text{sec}),$$

where this equation means that the value of $\theta_6$ is determined as a function h' of a change in the values of $T_e$ per unit of time. At a following step S136, the flag FLG is set to C2.

At the following cycle, a Yes determination is, thus, obtained at the step 130, and the routine goes to step S137 where it is determined that a change in the value of the detected after-evaporator temperature $T_e$ by the sensor 43, larger than a predetermined value, is obtained. When it is determined that a change larger than the predetermined value is obtained, i.e., the system is now in the phase between times t2 and t3, the routine goes to a step 138, where the calculation of the correction value $\Delta\theta_6$ by means of the equation 7 is continued.

A continuation of such a control finally causes the change in the value of the detected temperature $T_e$ to become smaller than the predetermined value, so that a result of the judgment at step S137 becomes negative. In this case, the routine goes to step S139, where the correction value $\Delta\theta$ is made zero, and to step S140, where the both of the flags FLG and SBR are cleared.

Figure 16:
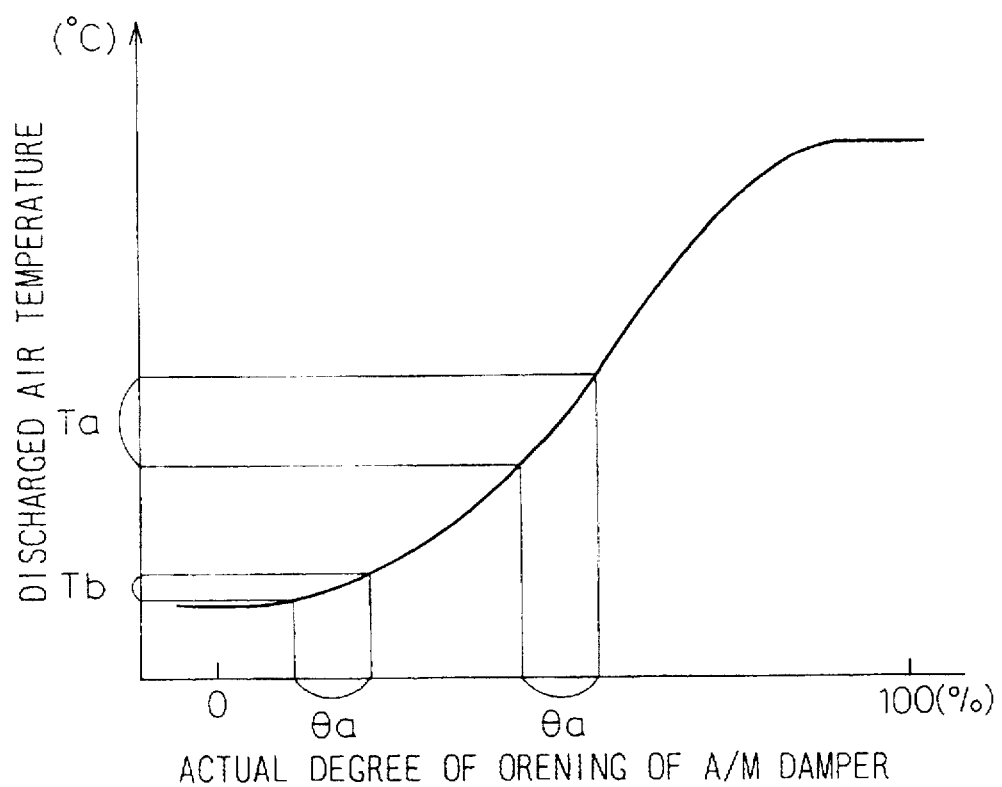
FIG. 16 illustrates the non-linear relationship between the degree of opening of a air mix damper and discharged air temperature.

Returning to FIG. 8, after the calculation of the correction value $\Delta\theta_0$ of the target value $\theta_0$ of the degree of the opening of the air mix damper 28 by the execution of the desired sub-routine S32, S34, S36 or S37, the routine goes to step S40, where the corrected target value $\theta_0$ is calculated using the equation (3), and to step S40', where an actual value directed to the actuator 29 for controlling the degree of opening of the air-mix damper is calculated as a function m of the corrected target value $\theta_0$. Namely, in FIG. 16, the relationship between the actual degree of opening of the air mix damper 28 and the temperature of the air discharged into the cabin is shown. This relationship is non-linear. Namely, the same range of angles of $\theta a$ at different as degrees of opening of the air-mix damper can provide different ranges $T_a$ and $T_b$ of values of the discharged air temperature. Thus, if the air-mix damper 28 were controlled in accordance with a linear relationship with respect to the calculated target value $\theta_0$, a precise correction of the discharged air temperature becomes impossible. In view of this, the function m is stored in the memory for transforming the calculated target value $\theta_0$ into the actual degree of the opening of the air-mix damper 28, so that the non-linear relationship between the degree of the opining of the air-mix damper 28 and the discharged air temperature is canceled.

Returning to FIG. 7, the finally obtained signal for operating the actuator 29 of the air-mix damper 28 at the step S40' is used at the step S10.

The above explanation of the first embodiment is focused on a frost cut operation, where the compressor 23 is turned ON or OFF to prevent the evaporator 4 from being frosted-up, i.e., the compressor is made OFF when the temperature of the air at the evaporator becomes lower than a predetermined value and is made ON when the temperature of the air at the evaporator becomes higher than a predetermined value, while the target temperature of the air discharged into the cabin is maintained unchanged. However, the idea of the present invention can be applied when the switch 80 is manually operated, the rotational speed of the compressor 23 is varied, or the capacity of the compressor 23 is varied. Namely, in such case, the present invention can prevent the temperature of the air discharged to the cabin from varying.

In the above first embodiment, in the automatic air conditioning mode, during a period of repeated ON and OFF operations of the compressor 23, an estimated after-evaporator temperature is calculated based on various factors such as a target after-evaporator temperature upon switching on of the compressor 23, a change of the detected after-evaporator temperature $T_e$ per unit of time, and the temperature $T_{ein}$ of the air introduced into the evaporator, and the estimated values are used for correcting the target value $\theta_0$ of the air mix damper 23. As a result, even in a situation of a switching of the condition of the compressor between the ON and OFF conditions, which causes the cooling capacity at the evaporator to be varied, a correction of the target value $\theta_0$ of the air mix damper 23 is done in accordance with the actual after-evaporator temperature TE to obtain a desired heating operation of the air at the heater core 27 irrespective of the existence of a delay in the response in the temperature signal from the after-evaporator temperature sensor 43. As a result, a reduction in the variation of the temperature of the air discharged into the cabin is obtained, thereby stabilizing the temperature of the air in the cabin.

In the first embodiment, the correction of the target degree of the opening of the air mix damper during a repetition of ON and OFF conditions of the compressor 23 is commenced by detecting a point ($t_7$, $t_{10}$ and $t_{13}$ in FIG. 9), at step S121 or S141, at which the detected after-evaporator temperature $T_e$ by the sensor 43 become unchanged. However, the present invention is not limited to this control. Namely, the correction of the target degree of the opening of the air mix damper can be commenced in synchronism with the ON or OFF condition of the compressor 23.

Furthermore, in the first embodiment, the correction for the dead time upon switching on of the compressor from a prolonged OFF state at sub-routine A (step S32 in FIG. 8) is carried out based on the duration of the preceding OFF condition, $T_{off}$ is larger than the predetermined value $T_\alpha$. In place of this, the correction between the dead time can be commenced by detecting the difference between the detected after-evaporator temperature $T_e$ and the target temperature. Namely, the target temperature at the anti-frost operation is about 3° C., and, during an operation other than anti-frost control, the difference with respect to the target value is larger than several degrees centigrade.

Second Embodiment

Figure 17:
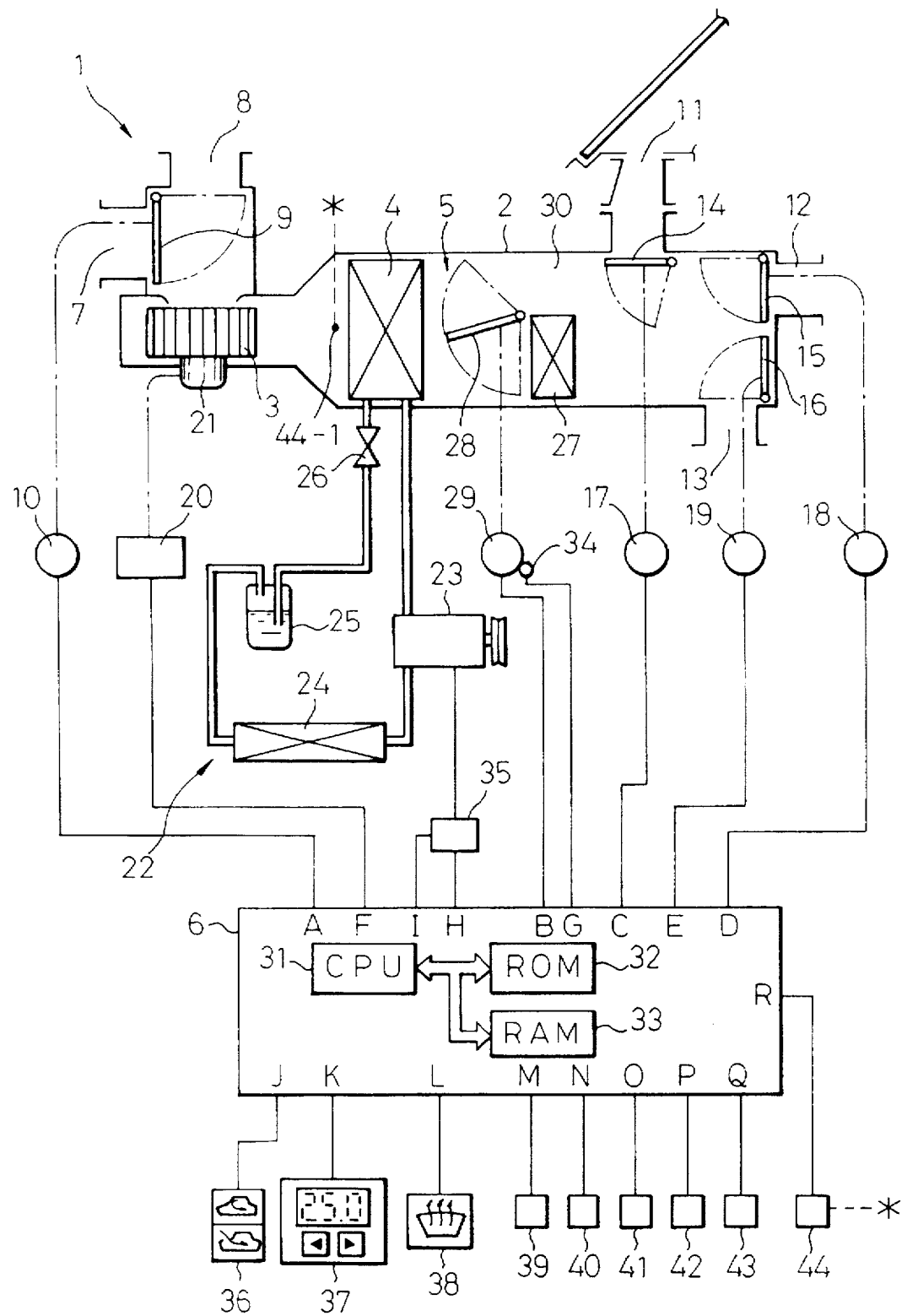
FIG. 17 is similar to FIG. 3, but illustrates a second embodiment.

FIG. 17 shows a automatic air conditioning system for an automobile in a second embodiment, which is similar to that shown in FIG. 3, except that a sensor 44 is added for detection of the temperature at a location 44-1 in the duct 2 adjacent to and upstream from the inlet of the evaporator 4. The sensor 44 has an output connected to a terminal R of the control unit 6, and this signal is used to compensate for the effect of the temperature of the air at the inlet of the evaporator on the behavior or response of the after-evaporator temperature.

The operation of the second embodiment is similar to that of the first embodiment. However, the detected value $T_{ein}$ of the sensor 44 can be used in the equation (6) for calculating the correction amount $\Delta\theta_5$, which is used for correcting the target value of the degree of the opening of the air-mix damper during the reversing phase between t1 and t2 in FIG. 14. Furthermore, the equation (4) for calculating the correction amount $\Delta\theta_1$, which is used for correcting the target value of the degree of the opening of the air-mix damper during the dead time between t2 and t3 in FIG. 10C can be modified to the following style, which is effective for further reducing a variation in the discharged air temperature.

$$\Delta\theta_1 = f(T_{e1} - T_{eon}, T_{ein}) \qquad (8).$$

Furthermore, as to the desired value A in FIG. 10D, a similar kind of a modification, taking the detected value Tein into the consideration, can be used.

Third Embodiment

Figure 18:
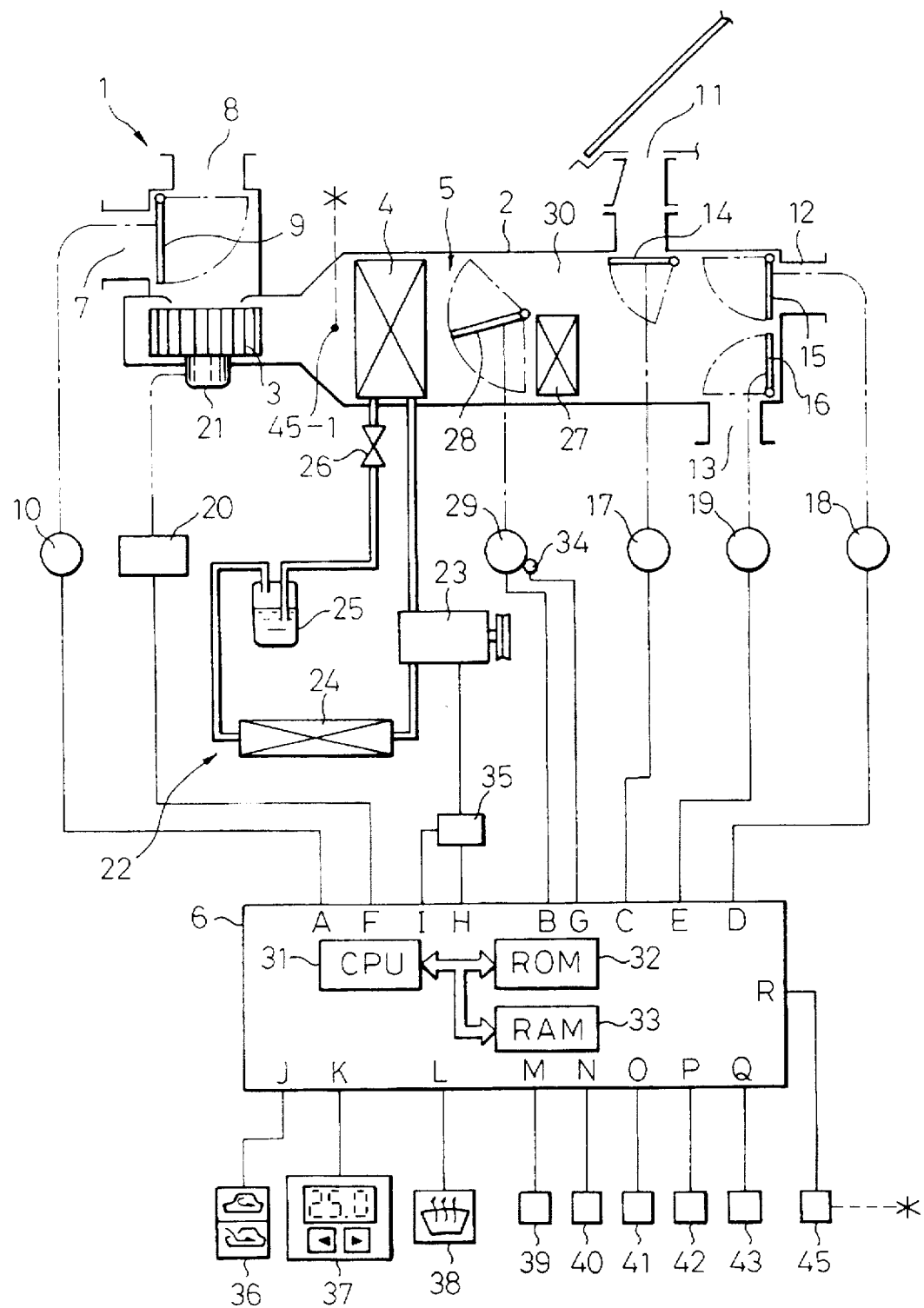
FIG. 18 is also similar to FIG. 3, but illustrates a third embodiment.

The behavior or response of the after-evaporator temperature is also varied in accordance with the humidity of the air sucked into the inlet of the evaporator 4. FIG. 18 shows an automatic air conditioning system for an automobile in a third embodiment, which is similar to that shown in FIG. 3, except that a sensor 45 is added for detection of the temperature at a location 45-1 in the duct 2 adjacent upstream from the inlet of the evaporator 4. The sensor 45 has an output connected to a terminal R of the control unit 6, and this signal is used to compensate for the effect of the humidity $RH_{in}$ of the air at the inlet of the evaporator on the behavior or response of the after-evaporator temperature.

The operation of the third embodiment is similar to that of the first embodiment. However, the equations (4) and (5) are modified to the following equations (9) and (10), respectively, so that a further reduction in the variation of the temperature of the air discharged to the cabin is produced.

$$\Delta\theta_1 = f(T_{e1} - T_{eon}, RH_{in}) \tag{9}$$

$$\Delta\theta_2 = f(T_{ein} - T_{e2}, RH_{in}) \tag{10}$$

Furthermore, as to the desired value A in FIG. 10D, a similar kind of a modification taking the detected value $T_{ein}$ into the consideration can be used.

Fourth Embodiment

FIGS. 19 and 20A to 20D show a fourth embodiment of the present invention. Construction of the air conditioning system is the same as that in FIG. 3 of the first embodiment. The control of the degree of the opening of the air mix damper 28 according to this embodiment will be explained.

In this embodiment, the CPU 31 determines a change in the after-evaporator temperature $T_e$ detected by the after-evaporator temperature sensor 43. Next, the CPU 31 calculates, based on the value of detected after-evaporator temperature $T_e$, an estimated actual after-evaporator temperature $ST_e(i)$ by using the following equation (11).

$$ST_e(i) = K_1 (T_e(i) - T_e(i-1)) + T_e(i-1) \tag{11}$$

where $K_1$ is a gain which is varied in accordance with the thermal capacity of the after-evaporator temperature sensor 43, and suffix i indicates that the detected temperature is the value obtained in this cycle, while suffix i−1 indicates that the detected temperature is the value obtained in the preceding cycle. According to this equation (11), the estimated after-evaporator temperature $ST_e(i)$ is calculated as a weighted average value between the detected temperature in this cycle $T_e(i)$ of a value of weight of $K_1$ and the detected temperature in the preceding cycle of a value of weight of $1-K_1$. The weighing is such that $ST_e(i)$ changes more quickly than $T_e$, so that the $ST_e(i)$ corresponds to the actual after-evaporator temperature.

Next, the CPU 31 calculates, based on the calculated estimated temperature STe(i), obtained using the equation (11), the target degree of the air mix damper 28 by the following equation (12).

$$\theta_0 = \frac{T_{ao} - ST_e(i)}{T_w - ST_e(i)} \times 100(\%), \tag{12}$$

where $T_w$ is the engine cooling water temperature detected by the sensor 41.

The CPU 31, then, issues a signal corresponding to the target degree $\theta_0$ of the air mix damper 28 to the servo motor 29, so that the degree of the opening of the air mix damper 28 is changed to the target value $\theta_0$. Note: in case where the air conditioning system is of a type with separate ducts for the driver's seat and the passenger's seat, the discharged air temperature can be independently controlled between the right and left seats.

Figure 19:
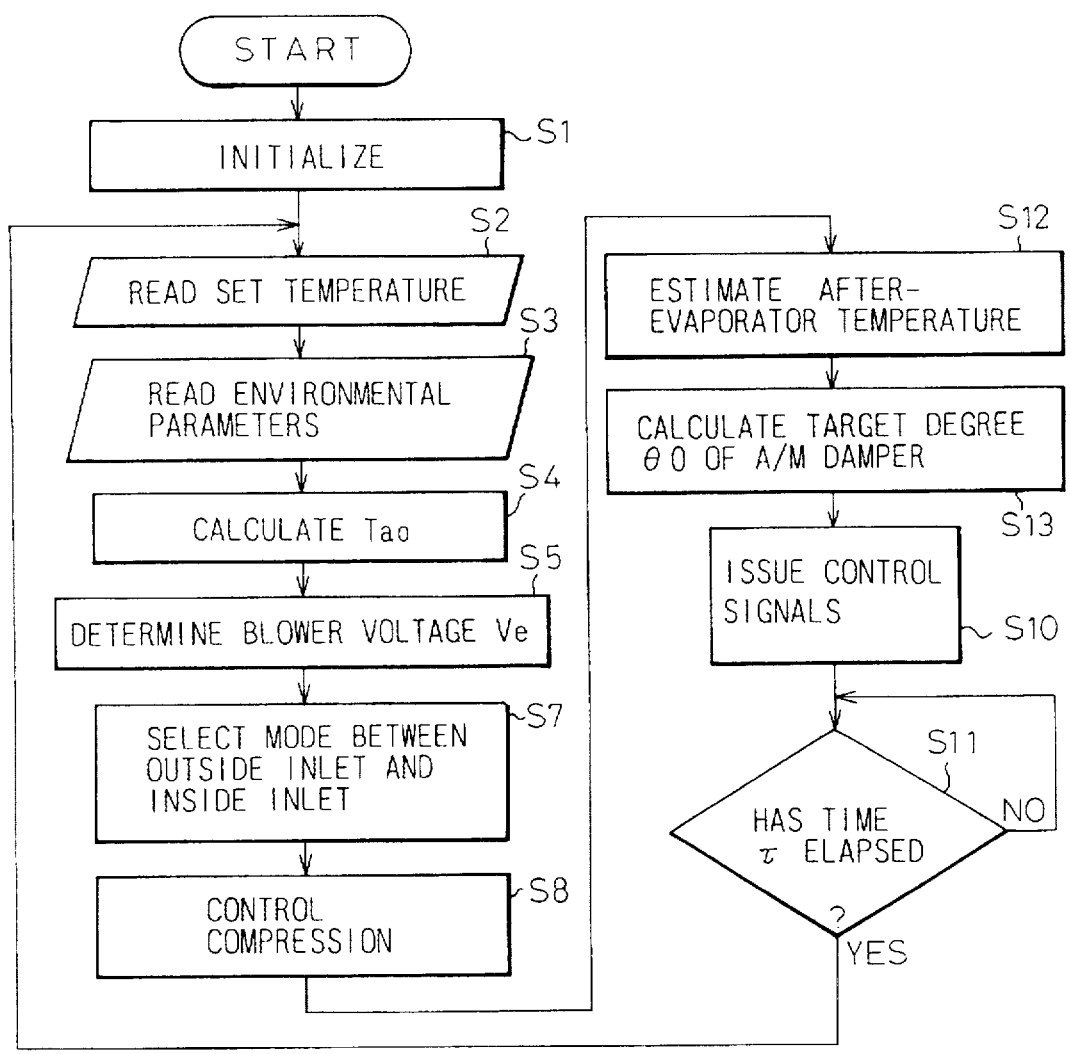
FIG. 19 is a general flowchart illustrating an operation of the embodiment in FIG. 18.
Figure 20:
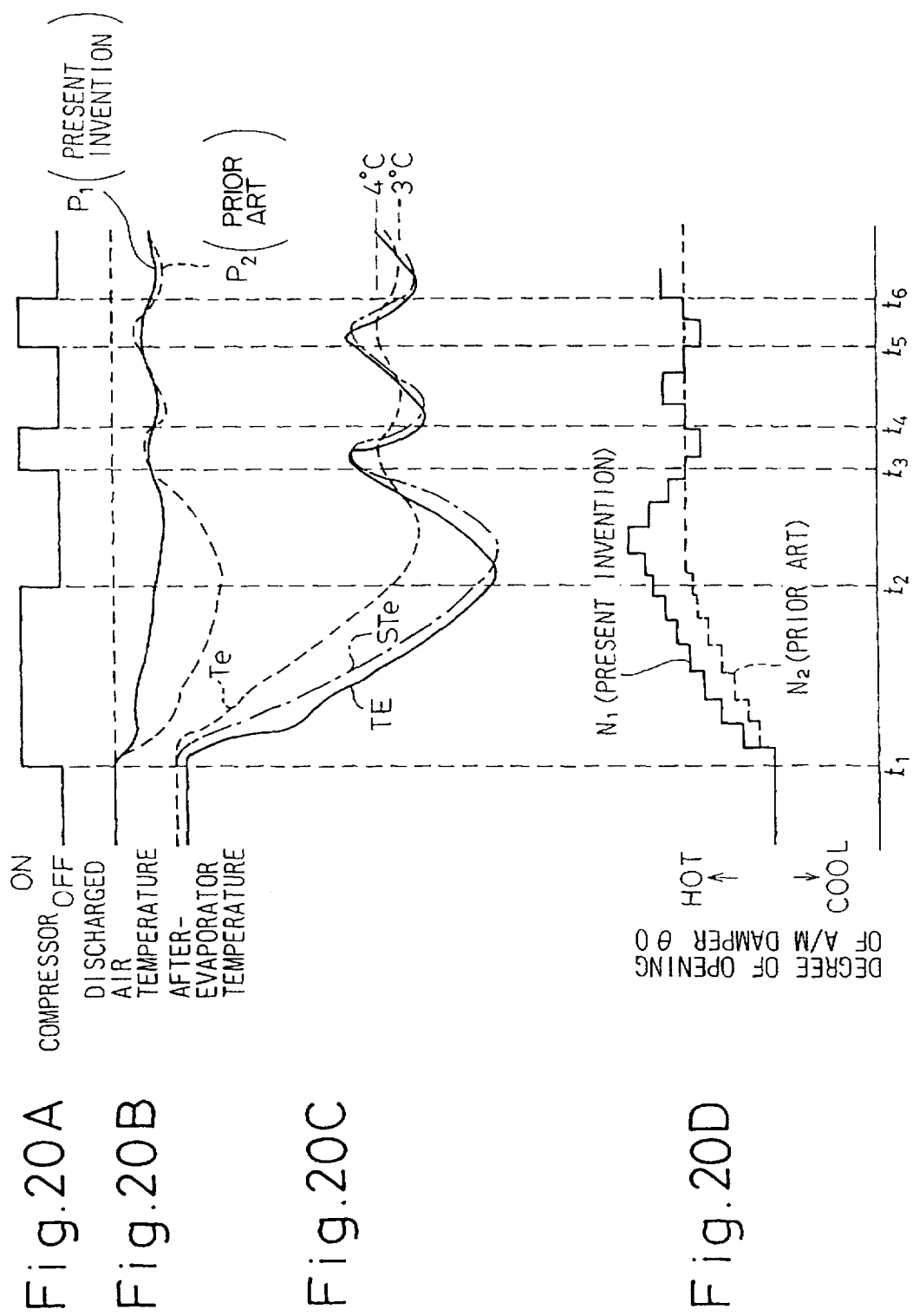
FIGS. 20A to 20D are time charts illustrating an operation of compressor, discharged air temperature, an after-evaporator temperature, and a correction amount of the degree of the opening of the air mix damper, respectively, in the embodiments FIG. 18.

Now, the operation of fourth embodiment will be explained with reference to the flowchart in FIG. 19. This flowchart is similar to that of FIG. 7 for the first embodiment. Thus, the explanation of the flowchart of FIG. 20 will be focused to points (steps S12 and S13) which are different from the flowchart in FIG. 7, while using the same reference numbers for blocks showing the same functions.

After the compressor control at the step S8, the routine goes to a step S12, where, based on the equation (11) stored in the memory (ROM 32), an estimated value of the actual after-evaporator temperature $ST_e(i)$ is calculated. Note: at the first routine just after the switching ON of the ignition switch, the value of $T_e(1)$ and $T_e(0)$ are both equal to the value of the detected after-evaporator temperature stored to the memory (RAM 33) at the preceding step S3. Then, at step S13, based on the equation (12) while using the stored value of the engine cooling water $T_w$, the target discharge air temperature and the estimated actual after-evaporator temperature $ST_e(i)$, the target value of degree of the air mix damper 28 is calculated.

FIG. 20C shows, when the compressor 23 is made ON after a sufficiently long duration in the OFF condition, i.e., by a depression of A/C switch, which is followed by a repetition of ON and OFF conditions of a relatively short duration in the defrosting operation, an actual after-evaporator temperature TE, a detected after-evaporator temperature $T_e$ by the after-evaporator temperature sensor 43, and an estimated after-evaporator temperature $ST_e(i)$. FIG. 20B shows a discharged air temperature, and FIG. 20D shows a target degree $\theta_0$ of the opening of the air mix damper 28.

The behavior of the detected after-evaporator temperature by the sensor 43 differs between a period (dead time), where the sensor signal is substantially unchanged, and a period (tracking period), where the sensor signal $T_e$ tracks the actual temperature TE with a certain delay time. The curve of the actual after-evaporator temperature TE is determined by the difference between the value of TE just before the compressor 23 is turned ON and the target after-evaporator temperature value just as the compressor 23 is turned ON, which is a value between 3° C. to 4° C.

In this embodiment, as the detected after-evaporator temperature $T_e$ commences its reduction, the estimated after-evaporator temperature calculated by the above equation (11) falls more quickly, so that the change in STe substantially imitates the change in the actual after-evaporator temperature TE. As a result, the target degree of the opening $\theta_0$ of the air mix damper 28 calculated using the STe as shown by a solid curve $n_1$ is moved to the direction HOT to increase the degree of the opening as compared with the curve $n_2$ obtained by the prior art. As a result, as shown in FIG. 20B, a curve $p_1$ of the discharged air temperature to the cabin of the present invention is moved quickly closer to the target temperature as compared with the prior art shown by a curve $p_2$.

In short, according to the automatic air conditioning system in the fourth embodiment, when the ignition switch is made ON, an estimation value $ST_e$ of the after-evaporator temperature TE is calculated based on a rate of change in the detected after-evaporator temperature $T_e$ per unit of time (cycle time τ) of between 1 to 4 seconds, i.e., the difference of the detected value at this cycle $T_e(i)$ from the detected value at the preceding cycle $T_e(i-1)$, as well as the heat capacity of the after-evaporator temperature sensor 43. As a result, the ratio of the amount of the air passing through the heater core 27 to the amount of the air by-passing the heater core is obtained. As a result, a desired control of the heating amount for the air passing through the heater core 27 is obtained, thereby reducing the variation in the temperature air discharged to the cabin, thereby obtaining a stabilized temperature of the air inside the cabin.

Fifth Embodiment

The fifth embodiment will now be explained, focusing on the control of the degree of the opening of the air mix damper 28, i.e., a correction of the target value of the degree of the opening $\theta_0$ of the damper 28. Switching of the compressor between the ON and OFF conditions is detected by the CPU 31 (FIG. 1). Then, the change in the detected after-evaporator temperature $T_e$ is determined. Then, when the compressor is manually turned on or made off, or when the system is in a transient state of the after evaporator temperature estimation operation, a calculation of an estimated value $ST_e(i)$ of the actual after-evaporator temperature is carried out by using the above mentioned equation (11). Then, the CPU 31 calculates the target degree of the opening $\theta_0$ of the air mix damper 28 using the above-mentioned equation (12). The CPU 31 issues a control signal corresponding to the calculated value of the target degree of the opening $\theta_0$ of the air mix damper 28, so that the actual degree of the opening of the air mix damper 28 is changed to this value $\theta_0$. When the air conditioning system is of a type provided with independent ducts for a driver's seat and a passenger's seat, the discharged air temperature is independently controlled between the right and left ducts.

Figure 21:
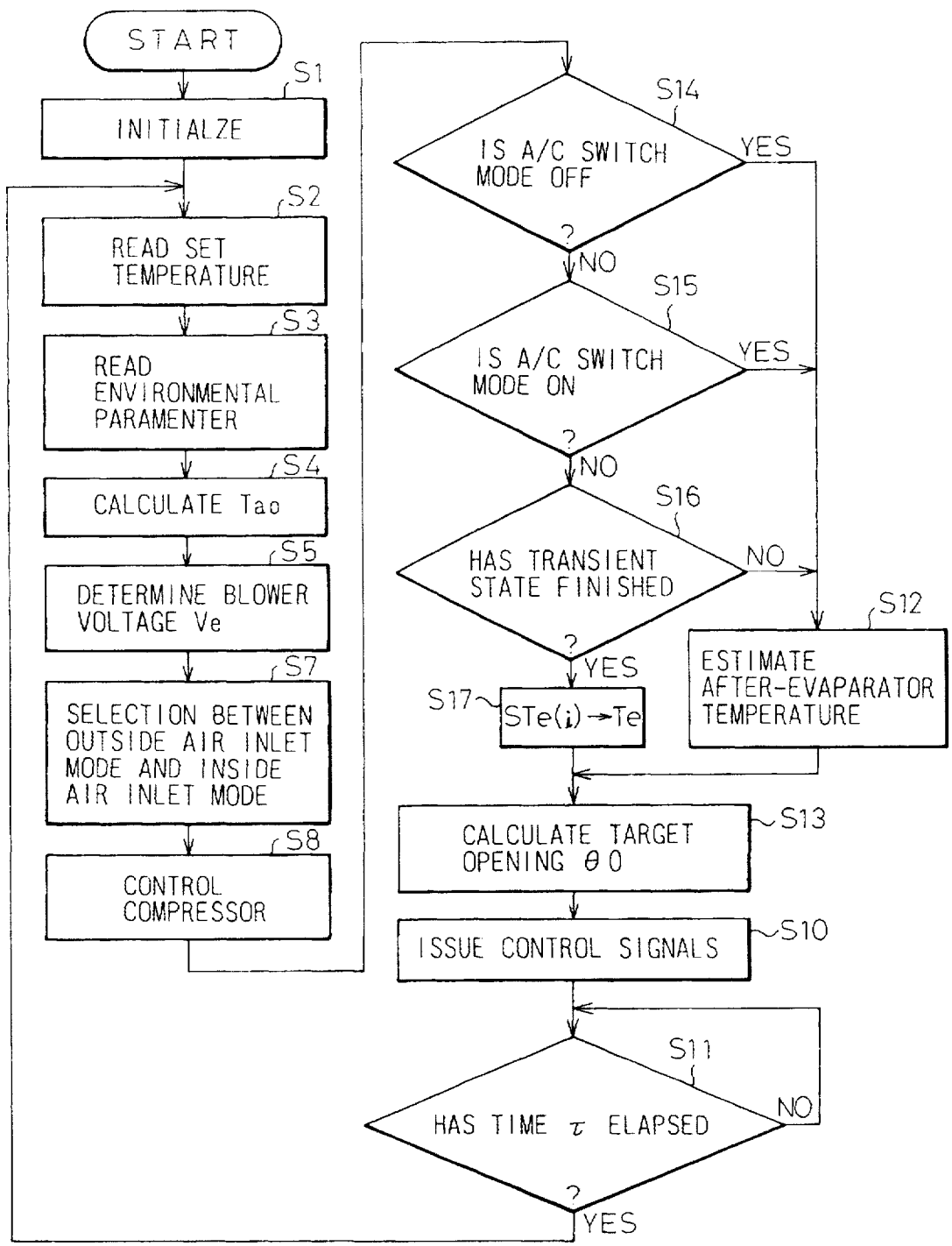
FIG. 21 is a general flowchart illustrating an operation of fourth embodiment.

The operation of the fifth embodiment will now be explained with reference to a flowchart in FIG. 21, which is partly similar to FIG. 7 of the first embodiment and FIG. 19 of the fourth embodiment. Thus, the explanation is focused on points different from the flowchart in FIGS. 7 and 19, while using the same reference number for similar steps. Namely, steps S1 to S8 in FIG. 21 are the same as the corresponding steps in FIG. 7. After the step S8, the routine goes to step S14, where it is determined that the air conditioning switch is turned OFF by depressing the OFF switch 82, the routine goes to step S12, where an estimated value of the after-evaporator temperature is calculated as similarly done in the fourth embodiment by using the equation (11), and flows into step S13. When it is determined that the air conditioning switch is not OFF at step S14, the routine goes to step S15, where it is determined that the air conditioning switch was turned ON by manually depressing the air conditioning switch 80 on the panel 70. When it is determined that the air conditioning switch is ON at step S15, the routine goes to the step S12 for estimation of the after-evaporator temperature. When the air conditioning switch is not ON at the step S15, the routine goes to step S16, where it is determined that it is in a transient state for carrying out an estimation of the after-evaporator temperatures. Namely, it is determined that it is in a predetermined time of, for example, 2 minutes has elapsed after commencement of the preceding operation for estimation of the after-evaporator temperature. In place of this determination, it is determined that a automatic ON and OFF control of the compressor for frost control, as shown in FIG. 5, has started. When it is determined that the system is still in the transient state for estimation of the after-evaporator temperature, the routine goes to step S12. When it is determined that the transient state control is finished, the routine flows into step S17, and it is considered that the detected after-evaporator temperature $T_e$ corresponds to the estimated after-evaporator temperature. Thus, for the value of estimated temperature at this cycle $STe(i)$, the detected after-evaporator temperature of this cycle $T_e(i)$ is used.

In short, in place of always executing the estimation of the after-evaporator temperature as in the fourth embodiment, the fifth embodiment executes the estimation of the after-evaporator temperature only when the air conditioning system is turned ON by depressing A/C switch 80 on the panel 70 or when the air conditioning system is made OFF by depressing the switch, thereby reducing the frequency of the operation of the air mix damper 28. In other words, the control of the air mix damper is only done upon switching on or off of the compressor, which otherwise causes the temperature of the air discharged into the cabin to be changed. Due to the reduction of the unnecessary operation of the air mix damper, an increased service life of the servo-motor for driving the air mix damper 28 can be obtained.

In the above fifth embodiment, calculation of the estimated after-evaporator temperature is done only when the compressor is turned on or off by operating the air conditioning switch 80 on the panel 70 in the cabin. However, the idea of this embodiment can be applied to a control wherein the compressor is made off when the outside air temperature is reduced to a predetermined value of for example 0° C. The idea of this embodiment can also be applied when an operating condition of the refrigerating cycle is highly changed.

Sixth Embodiment

The above 1st to 5th embodiments are directed to the correction of the temperature upon switching on or off of the compressor. However, such switching on or off also causes the humidity at the cabin to change. Namely, an air conditioning system can be usually be provided with a system for maintaining the humidity felt by a passenger as disclosed in Japanese Un-Examined Patent Publication No. 57-139240. However, this patent requires an expensive means such as a humidity sensor. Thus, it is usual, in place of a provision of the humidity sensor, to correct the target discharged air temperature Tao upon the switch on or off of the compressor while compensating for a variation in a humidity. However, in case of an automatic air conditioning system where, in accordance with the target discharged air temperature, the selection of the outlet for discharging the air as well as the amount of the air flow are automatically controlled, the humidity correction of the target air temperature is done only in accordance with the on or off condition of the air conditioning control switch, so that the control is done by limiting the heating capacity, i.e., by reducing the discharged air temperature, thereby causing the passenger to feel the heating operation to be insufficient during a heating operation. According to this embodiment, in order to obviate this problem, a selective humidity control is done. Namely, the correction is not done when a required heat amount is larger than a predetermined value, i.e., when the system is in a heating mode.

Figure 22:
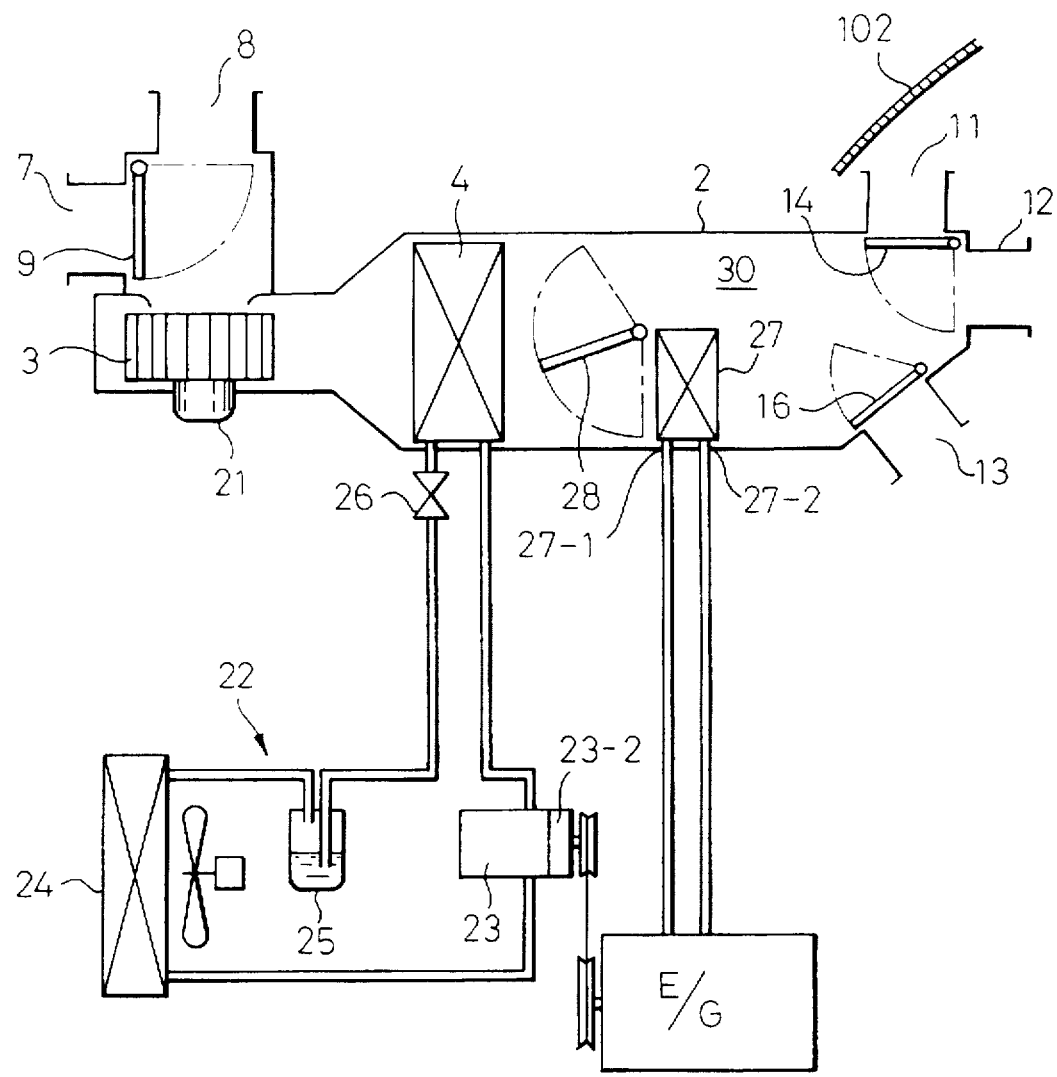
FIG. 22 is a schematic view of a air conditioning system in fifth embodiment.
Figure 23:
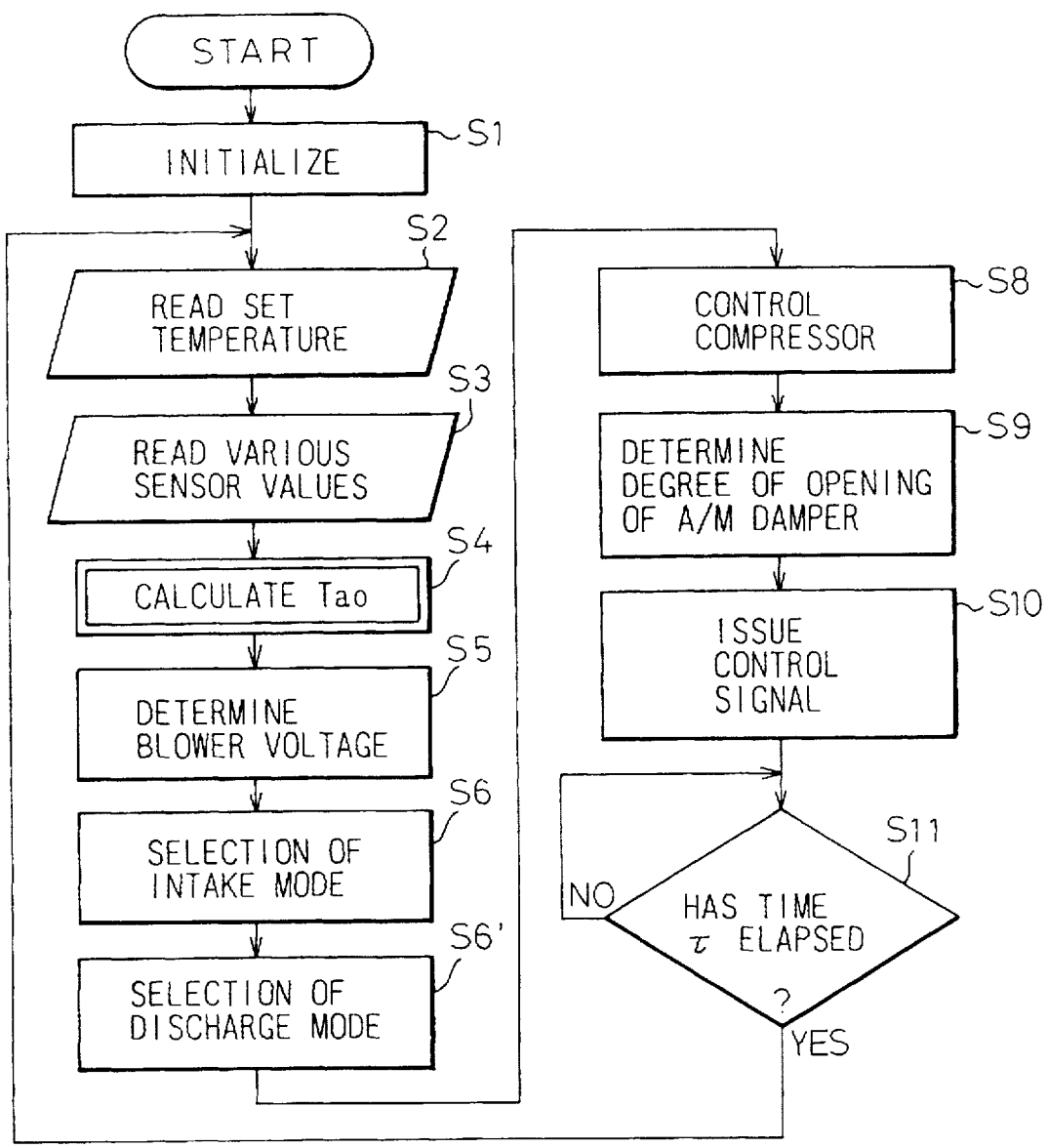
FIG. 23 is a general flow chart illustrating an operation of the embodiment in FIG. 22.

The 6th embodiment will now be explained. FIG. 22 is a schematic view of the air conditioning system, which is basically the same as FIG. 3, although unnecessary parts are omitted, and an internal combustion engine(E/G) is shown. Thus, a detailed explanation is eliminated while using the same numbers for parts of the same functions. FIG. 23 is a flowchart which is also similar to the flowchart in FIG. 7. Therefore, the explanation of the flowchart is simplified to avoid duplicate explanation, while using the same numbers for the similar functions. A detail of the step S4 for determining the discharged air temperature Tao will be explained later. At step S5, a blower voltage at the blower motor 21 is determined in accordance with the calculated target discharged air temperature as shown in Fig. FIG. 24, which is similar to FIG. 6.

Figure 25:
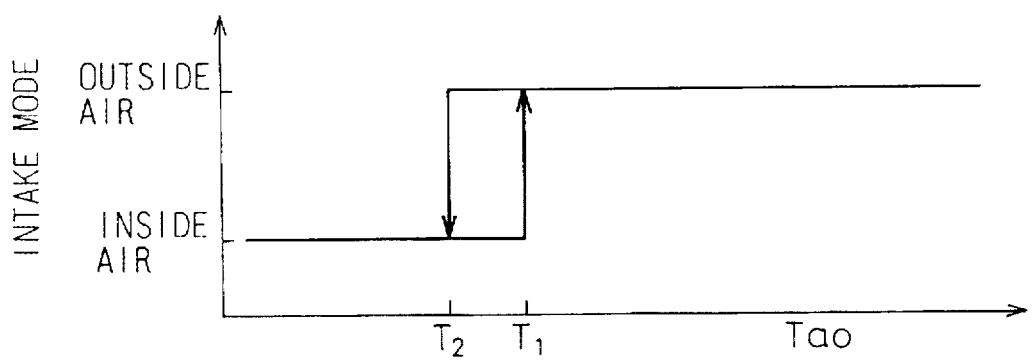
FIG. 25 is a diagram illustrating a setting of a selection of an inlet mode.

At step S6, a selection of the inlet between the inside air inlet 7 and outside air inlet 7 is done in accordance with a diagram in FIG. 25. Namely, an increase of the target discharged air temperature Tao to a predetermined value $T_1$ causes the damper 9 to take a position as shown by a solid line so as to open the outside air inlet 8, so that outside air is introduced into the duct 2. Contrary to this, a reduction of the target discharged air temperature Tao to a predetermined value $T_2$ causes the damper 9 to take a position as shown by a dotted line so as to open the inside air inlet 7, so that inside air is introduced into the duct 2.

Figure 26:
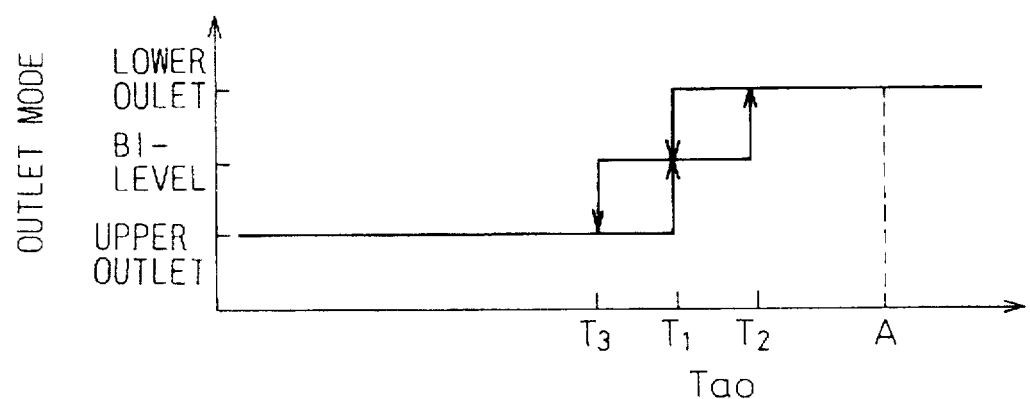
FIG. 26 is a diagram illustrating a setting of a selection of a discharge outlet.

At step S6', a selection of the outlet between the upper outlet (12) mode, the lower outlet (13) mode and bi-level mode, as shown in FIG. 26 is done. Namely, an increase of the target discharged air temperature Tao to a predetermined value $T_1$ causes the dampers 14 and 16 to open the upper and lower outlets 12 and 13 to obtain a bi-level mode wherein the air is discharged to the cabin from both of the outlets 12 and 13. An increase of the target discharged air temperature Tao to a predetermined value $T_2$ causes the dampers 14 to open the upper duct to obtain upper outlet mode wherein the air is discharged to the cabin from the upper outlet. A reduction of the target discharged air temperature Tao to a predetermined value $T_1$ causes the damper 12 to open the lower outlet to take the lower outlet mode. Setting of the operation of the compressor at the step S8 is the same as explained with reference to FIG. 5 in the first embodiment.

At step S9 in FIG. 23, the degree of the opening of the air mix damper 28 is calculated in accordance with the above mentioned equation (2), which is explained with reference to the first embodiment. The control signals are issued to various actuators at step S10, and the step S11 is a wait routine until a cycle time τ has elapsed.

Figure 24:
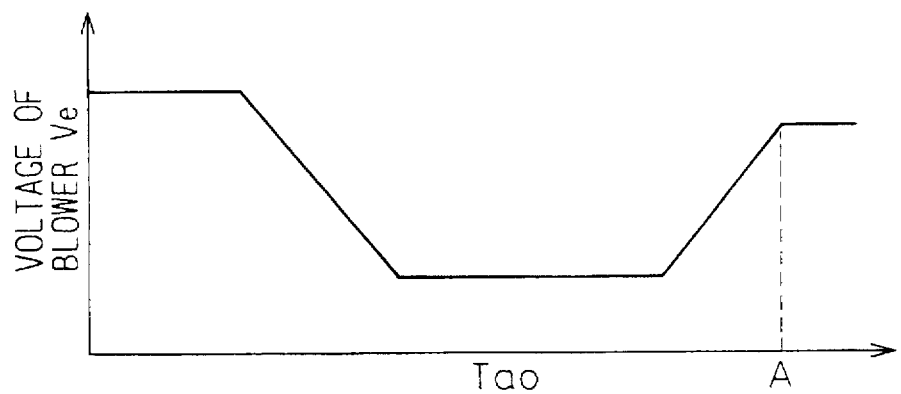
FIG. 24 is similar to FIG. 6 but illustrating a setting of a target air temperature in the embodiment in FIG. 22.

Now, a detail of step S4 for calculating the target discharged air temperature Tao will be explained with reference to a detailed flow chart in FIG. 27. Namely, at step S400, a value of the target discharged air temperature Tao' is calculated using the following equation, $$T_{ao}' = K_{set} \times T_{set} - K_r \times T_r - K_{am} \times T_{am} - K_s \times T_s + C,$$

which is the same as equation (1), explained with reference to the first embodiment, and $K_{set}$ is a constant for the setting temperature $T_{set}$, $T_r$ is a constant for the inside air temperature $T_r$, $T_{am}$ is a constant for the outside air temperature $T_{am}$, $K_s$ is a constant for the solar radiation $T_s$, and C is a correction constant. At step S401, it is determined if the calculated target temperature Tao' is larger than a predetermined value A, which is shown in FIG. 24 and which is a value of the target temperature in a heating mode. When it is determined that Tao'>A, i.e., the air conditioning system is in a heating operation, the routine goes to step S402, where the calculated value Tao' is moved to Tao. Namely, the target temperature Tao as calculated by the above equation (1) is used as it is. In other words, a correction of the target temperature Tao for correcting the humidity is not done during the heating mode, which is effective for preventing the heating performance from being reduced. When it is determined that Tao'≦A. i.e., the system is not in the heating operation, the routine goes to step S403, where a determination is done if, the air conditioning OFF switch 82 is made ON. When it is determined that the air conditioning switch is not made OFF, the routine goes to the above mentioned step S402 for maintaining the calculated target value Tao.

When it is determined that the air conditioning switch is made ON at step S403, the routine goes to step S404, where a value of the calculated target discharged air temperature Tao' minus a correction amount α for correcting a temperature increase felt by a person in the cabin due to an increase in the humidity by stopping the compressor 23, i.e., the evaporation at the refrigerator in the refrigerating cycle. The correction amount α is obtained by calculating, first, a difference between an average humidity at the cabin when the A/C ON switch 80 is made ON, i.e., the compressor 23 is operated, and an average humidity at the cabin when the A/C OFF switch 82 is made ON, i.e., the compressor 23 is not operated, and a value of a temperature difference of, for example, 5° C., which is converted from the calculated difference of the humidity, which is obtained using ET diagram.

In short, in this embodiment, a correction to the target discharged air temperature for compensating for the temperature increase felt by a passenger due to an increase in a humidity by switching off the compressor is canceled during the heating mode, i.e., the target temperature Tao' is larger than a predetermined value A, which is effective for maintaining desired feeling during heating mode, which is otherwise reduced due to the reduction of the target discharged air temperature.

Seventh Embodiment

Figure 28:
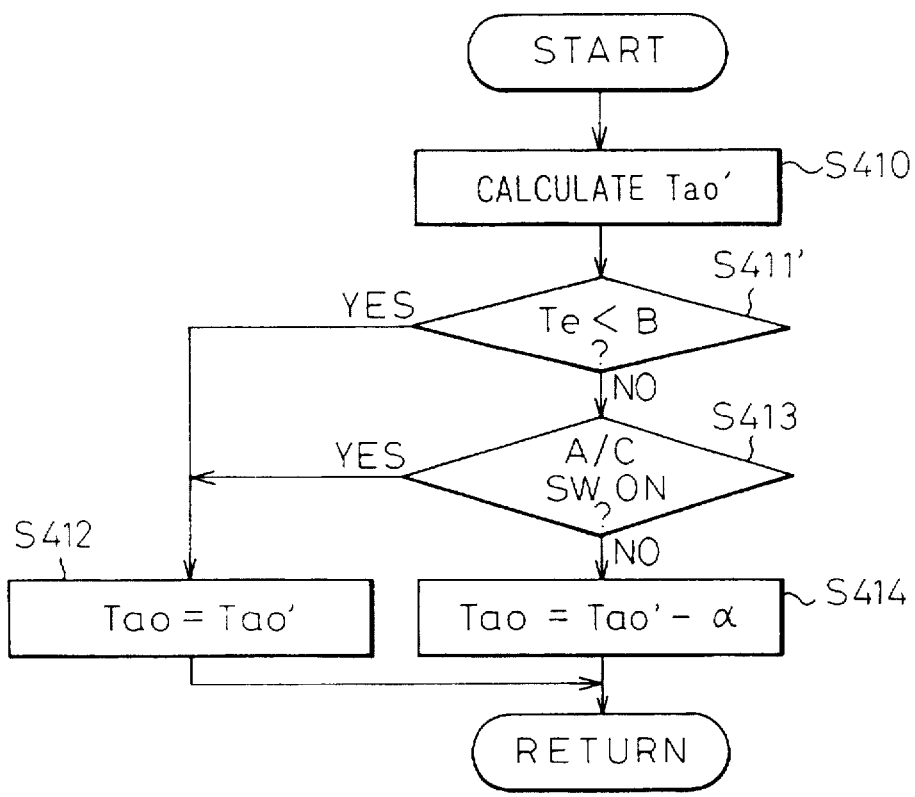
FIG. 28 is similar to FIG. 27, but illustrates another embodiment.

FIG. 28 is a flowchart illustrating a seventh embodiment of the present invention, which is directed to the second aspect explained with reference to the sixth embodiment. This embodiment features that the target discharged air temperature Tao is determined in accordance with the detected after-evaporator temperature $T_e$ by means of the after-evaporator temperature sensor 43 (FIG. 1).

Figure 27:
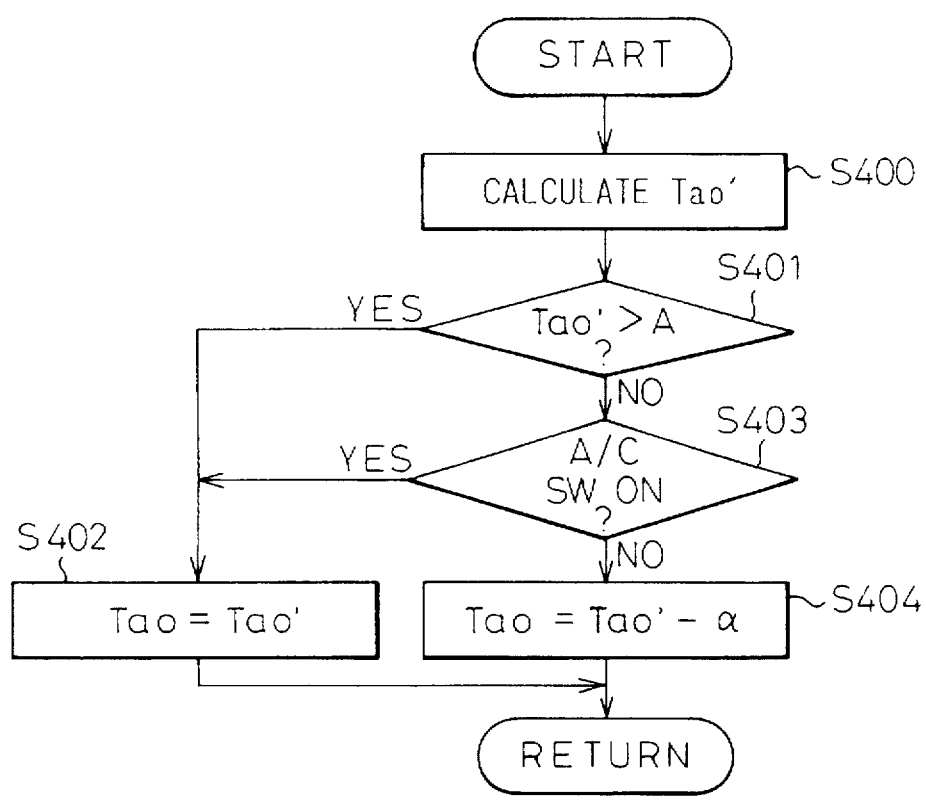
FIG. 27 is a flowchart of a routine for calculation of the target air temperature in FIG. 23.

This flowchart in FIG. 28 differs from the flowchart in FIG. 27 only in that, at step S411', it is determined if the detected after-evaporator temperature $T_e$ is smaller than a predetermined value B. In other words, checking of a necessity of the correction of the target discharged air temperature upon the switching off the compressor by the A/C switch 80 is done by the determination of the detected after-evaporator temperature larger than the predetermined value B. Namely, after-evaporator temperature $T_e$ detected by the sensor 43 varies in accordance with the temperature of the air sucked into the evaporator 4 (an outside air temperature). Namely, smaller the outside air temperature, smaller the after-evaporator temperature $T_e$. Contrary to this, larger the outside air temperature, larger the after-evaporator temperature $T_e$. Thus, the predetermined value B is a value of the detected after-evaporator temperature $T_e$ corresponding to a outside air temperature of, for example, $-5°$ C., when the lower outlet mode (heating operation) is selected. Thus, in the embodiment, when $T_e$<B, i.e., the system is operating under the heating mode, a correction to the target air temperature is not done (step S412) even in the case of switching OFF of the compressor by the A/C switch 80. Thus, a desired heating operation can be obtained, without making the passenger to feel that the heating is insufficient.

Eighth Embodiment

Figure 29:
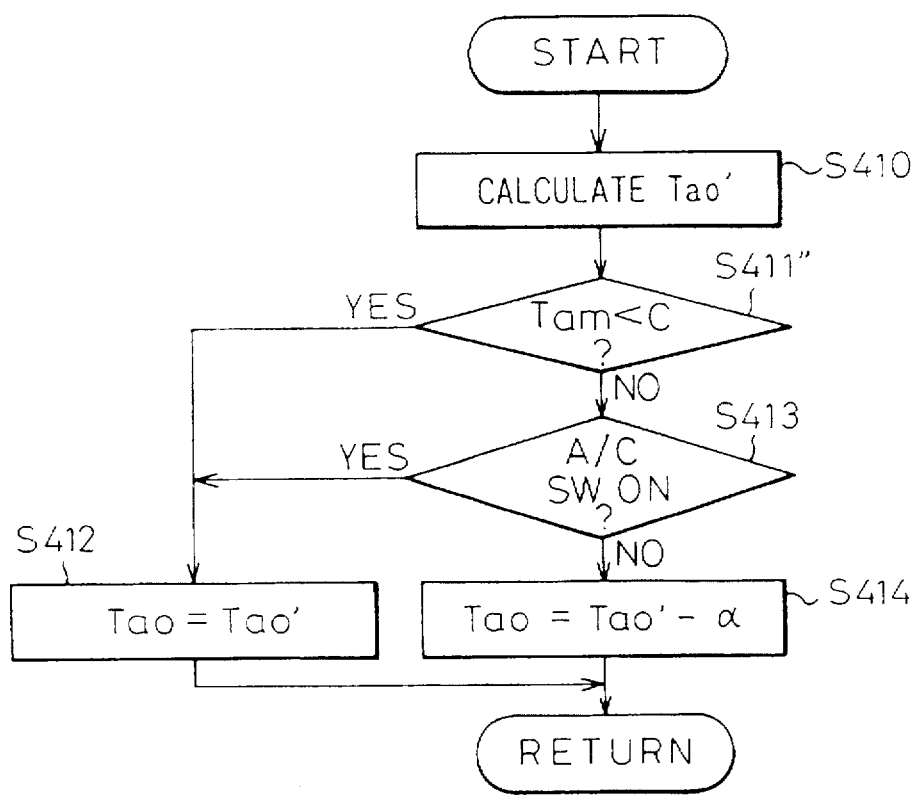
FIG. 29 is also similar to FIG. 27, but illustrates another embodiment.

FIG. 29 shows a 8-th embodiment, which is the same as the embodiments in FIGS. 27 and 28, except that a determination if a correction of the target value Tao' of the discharged air temperature is necessary is done in accordance with the outside air temperature Tam.

In FIG. 29, after the calculation of the target air temperature Tao' at step S410, the routine goes to step S411", where it is determined whether an outside air temperature Tam is smaller than a predetermined value C. When it is determined that the outside air temperature Tam is smaller than a predetermined value C, i.e., the system is under a heating mode, the routine goes to step S412 where the calculated target air temperature Tao' is moved to Tao so that a correction of the target discharged air temperature during the heating operation is not done. The lower the outside air temperature Tam, the lower the absolute temperature. Thus, the predetermined value C is, for example, of a value of 7° C., which is located in an area where the lower outlet mode (heating mode) is selected and the absolute temperature is small, where a change in the humidity caused by a change of the state of the A/C switch between ON and OFF positions is small.

When it is determined that the Tao' is equal to or larger than C, the routine goes to step S413 to check if the A/C switch is ON. Upon a determination of the ON condition, the routine goes to step S412 for preventing the target temperature Tao from being corrected. Contrary to this, upon a determination of the OFF condition at the step S413, the routine goes to step S414 for executing the correction of the target temperature Tao. In short, according to this embodiment, the correction operation (step S414) is canceled when the outside temperature Tam is smaller than the predetermined value, i.e., during the heating operation, thereby preventing the passenger from felling that the heating is insufficient.

As a modification, instead of the outside air temperature Tam, a physical parameter value related to the outside air temperature Tam, such as the temperature of the air at the inlet side of the refrigerant evaporator 4, can be used. Furthermore, an outside air temperature value after subjecting the detected value to a particular correction process, such as an initial value holding or vehicle speed correcting process for canceling the effect of a hot air from an internal combustion engine which is provided for a vehicle having a display of an outside air temperature, can also be used.

Nineth Embodiment

A 9-th embodiment is further modification of the second aspect of the present invention. Namely, the embodiment features correction amounts that are independently set when the compressor is operated and when the compressor is not operated, and that, compared with when the refrigerant compressor is operated by a energizing signal, when the compressor is stopped by the stopping signal, the heat amount of the air discharged into the cabin for a desired amount is reduced.

Figure 30:
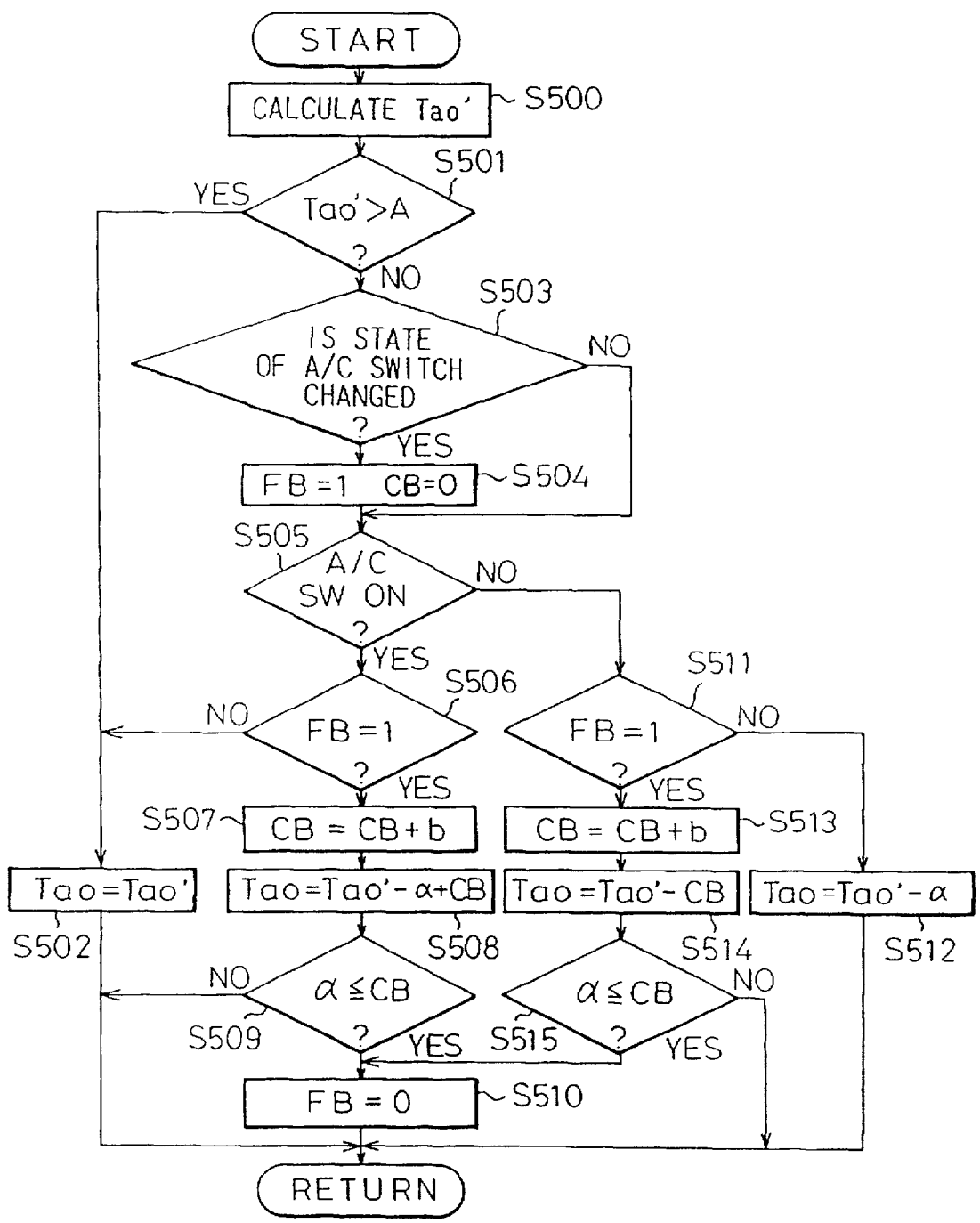
FIG. 30 is a flowchart of a routine for calculation of the target air temperature in another embodiment.

A routine for setting the target discharged air temperature at step S4 will be explained with reference to a detail flow chart in FIG. 30. At step S500, a calculation of the target discharged air temperature Tao' is done in accordance with the equation the equation (1). At step S501, it is determined that the Tao' is larger than the predetermined value A of, for example, 50° C. as in step S401 in FIG. 27 in 6-th embodiment, to check if the system is now the heating mode. When it is determined that $T_{ao}$'>A, i.e., the system is in the heating mode, the routine goes to step S502, where the calculated value of the Tao' is moved to Tao. In other words, the target value as calculate by the equation (1) is used for the following procedures as it is, so that a correction of the target air temperature $T_a$ is not done.

When it is determined that $T_{ao}$'≦A, i.e., the system is not in the heating mode, the routine goes to step S503, where a change between ON and OFF conditions of the compressor 23 is tested. When it is determined that a state change between ON and OFF conditions of the compressor 23 occurred, the routine goes to step S504, where a ramp control flag FB is set and a correction amount CB is cleared. Then, the routine goes to step S505, where it is determined that the air conditioning switch 80 in FIG. 4 is ON. When it is determined that the air conditioning switch 80 in FIG. 4 is ON, the routine goes to step 506, where it is determining that the ramp control flag FB is set. When it is determined that the ramp control flag FB is set (FB=1), this means that the system is now in a ramp control period between $t_1$ and $t_2$ in FIG. 31B. In this case, the routine goes to step S507, where the correction amount CB is incremented for predetermined value b, and to step S508, where the corrected target discharged air temperature Tao=is calculated by $$T_{ao}=T_{ao}'-\alpha+CB,$$

where α is a correction amount for compensating for a temperature increase as felt by a passenger due to the reduction of the cooling effect by switching off of the refrigerating cycle, as explained with reference to 6-th embodiment (step S404 of FIG. 27). Since the lamp correction amount CB is added to Tao−α, the target discharged air temperature Tao is gradually increased toward from $T_{ao}$−α to $T_a$ as shown by a curve $Q_1$ in FIG. 31B as the time is elapsed from the moment of the switching ON of the compressor. At step S509, it is checked if the correction amount α is equal to or smaller than the lamp correction amount CB. When it is determined that α≦B, i.e., the system is still in the lamp correction phase between $t_1$ and $t_2$ in FIG. 30B, the step S510 is by-passed to continue the lamp correction routine. When it is determined that α>B, i.e., the system has come to the point $t_2$ in FIG. 31B, the routine goes to step S510, where the flag FB is cleared. As a result, at the following cycle after the lapse of τ seconds, a NO determination is obtained at the step S506, which causes the routine goes to step S502. Thus, in a phase between $t_2$ and $t_3$, the Tao is fixed to the target temperature Tao' as calculated by the equation (1).

When it is determined that the air conditioning switch 80 in FIG. 4 is OFF at step S505, the routine goes to step S511, where it is determining that the ramp control flag FB is set. When it is determined that the ramp control flag FB is set (FB=1), this means that the system is now in a ramp control period between $t_3$ and $t_4$ in FIG. 30B. In this case, the routine goes to step S513, where the correction amount CB is incremented for predetermined value b, and to step S514, where the corrected target discharged air temperature Tao=is calculated by $$T_{ao}=T_{ao}'-CB.$$

Figures 31A, 31B:
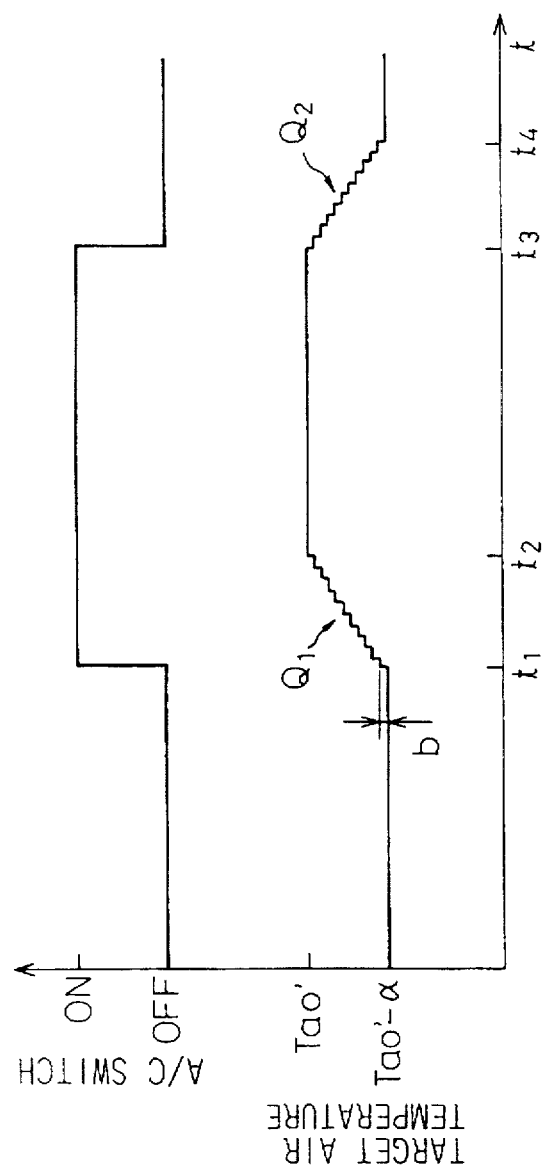
FIGS. 31A and 31B are timing charts illustrating an operation of an air conditioning switch and a value of the target air temperature, respectively, in the embodiment in FIG. 29.

Since the lamp correction amount CB is subtracted from Tao', the target discharged air temperature Tao is gradually reduced toward Tao−α as shown by a curve $Q_2$ in FIG. 31B as the time is elapsed from the moment of the switching ON of the compressor. At step S515, it is checked if the correction amount α is equal to or smaller than the lamp correction amount CB. When it is determined that α≦B, i.e., the system is still in the lamp correction phase between $t_3$ and $t_4$ in FIG. 31B, the step S510 is by-passed to continue the lamp correction routine. When it is determined that α>B, i.e., the system has come to the point $t_4$ in FIG. 31B, the routine goes to step S510, where the flag FB is cleared. As a result, at the following cycle after the lapse of τ seconds, a NO determination is obtained at the step S511, which causes the routine goes to step S512. Thus, in a phase after time $t_4$, the Tao is fixed to the target temperature Tao'−α, which is suitable for compensating an increase of temperature felt by the passenger due to an increase in humidity by the stoppage of the refrigerating cycle.

In short, in this embodiment, a correction of the change in the temperature felt by a passenger due to a change in humidity caused by state of the change of the air conditioning apparatus between ON and OFF condition is gradually done using the ramp control $Q_1$ and $Q_2$. Such a gradual control is effective to maintain a comfortable air conditioning, while preventing a passenger from feeling uncomfortable, irrespective of a rapid change in the state of the operation of the inlet and/or outlet mode, as well as the amount of the air flow.

In the 7th to 9th embodiments, the temperature correction amount α is made constant. However, the temperature correction amount α may be variable, so that it becomes larger at a OFF condition of the A/C switch, where it is predicted that the humidity at the cabin is high.

In place of correcting the target air temperature by the amount α when the A/C switch is made OFF, a correction of the target discharged air temperature Tao can be done in accordance with any parameter related to the target discharged air temperature Tao, i.e., variables, in the equation, including constants for the setting temperature $T_{set}$, for the inside air temperature $T_r$, for the outside air-temperature $T_{am}$, and for the solar radiation $T_s$.

In the 7th to 9th embodiments, upon a change of state of the A/C switch between ON and OFF conditions, a linear or step-like change in the temperature correction amount α is done. However, in place of such a linear change, the amount α can be changed non linearly.

In the 7th to 9th embodiments, the refrigerating system is an ON-OFF type, where the compressor is subjected to an ON-OFF control by means of a clutch. However, the refrigerating circuit can be of a type with EPR (evaporating pressure regulator), wherein a vapor pressure control valve is arranged between the evaporator and the compressor, or a variable capacity type refrigerating circuit, where a compressor with a variable volume unit is employed.

MODIFICATIONS

Throughout the embodiments as explained, the air mix damper 28 is formed as a plate type damper. However, in place of the plate type damper, the air mix damper may be a slide type or a film type. A plurality of air mix dampers may be provided. Furthermore, in case where a plurality of heater cores may be arranged in a duct, each of the heater cores can be provided with one or more air mix dampers.

In the illustrated embodiments, the air mix damper 28 is used as a means for controlling the temperature of the air discharged to the cabin. However, in place of the air mix damper, a re-heat type control means for controlling the temperature of the discharged air can be employed, where a correction of the amount of the engine cooling water introduced into the heater core 27 is done in accordance with the present invention.

In the illustrated embodiments, the heater core 27, as a means for heating, is employed. However, as for the heating means, an electric heater or a condenser of a refrigerant in a refrigerant circuit can be employed. In case where the condenser is used, a correction to the amount of the refrigerant introduced into the condenser can be done for controlling a discharged air temperature. In order to obtain a correction of the amount of the refrigerant, a correction to a frequency by means of an inverter or a correction to a rotational speed of a compressor can be employed.

The illustrated embodiments are directed to an automatic air conditioning system for an automobile. However, the present invention can be applied to various other fields, including an air conditioning system for other kinds of vehicles, an air conditioning system for an airplane, an air conditioning system for a ship, and a stationary type of air conditioning system for a house or factory.

In the illustrated embodiments, as for a cooling means, an evaporator 4 in the refrigerating circuit is used. However, in place of the cooling means, a cooling element such as a Peltier element can be used. Furthermore, in place of an ON-OFF control, a variable-volume-type compressor can be used, wherein the cooling capacity of the compressor is controlled. In this case, in order to determine the change in the cooling capacity of the compressor, a change in the amount of the refrigerant in the refrigerating circuit or a change in the operating condition (rotational speed) of the compressor can be detected.

Furthermore, the present invention can be applied to an air conditioning system capable of varying a target value of temperature for a frost cut operation as is employed in an economy mode of the air conditioning system.

Furthermore, the behavior of the after-evaporator temperature 43 can also varied in accordance with the amount of the air flow caused by the blower 3. Thus, a correction in accordance with the amount of the air flow caused by the blower can be also done. Furthermore, a combination of at least two features of the various embodiments can be combined.

In the embodiment, a cooling capacity of the evaporator 4 is detected by the after-evaporator sensor 43. However, the cooling capacity can be detected by a sensor for detecting the temperature of a fin in the evaporator 4. Furthermore, the cooling capacity of the evaporator 4 can be detected using the pressure in a low pressure section of the refrigerating circuit or the evaporating temperature of the refrigerant in the refrigerating circuit.

We claim:

1. A system for air conditioning a cabin of a vehicle to be air conditioned, the system comprising:

(a) a duct for introducing a flow of the air into the cabin;

(b) a refrigerating circuit for a refrigerant having a compressor and an evaporator arranged in the duct to contact the air flow in the duct, so that a heat exchange occurs between the refrigerant in the evaporator and the air in the duct;

(c) heating means arranged in the duct for contacting with the air flow for heating the cooled air from the evaporator;

(d) means, responsive to a manipulation by a passenger, for issuing, selectively, a first signal for energizing the compressor and for issuing a second signal for de-energizing the compressor;

(e) means for detecting at least one environmental parameter related to a temperature of the cabin;

(f) means for setting a desired cabin temperature;

(g) means, for calculating a calculated target air temperature of the air discharged into the cabin from the duct, said calculating being based on the detected environmental parameter and on the desired cabin temperature;

(h) means for detecting a physical parameter related to the temperature of air outside the cabin;

(i) means for calculating a corrected target air temperature so that the calculated target air temperature is reduced by a predetermined value when the compressor is de-energized by the second signal, whereby the value of the corrected target air temperature when the compressor is de-energized by the second signal is less than the value of the target air temperature when the compressor is energized by the first signal;

(j) means for controlling the heating means so that:

(A) the corrected target air temperature is obtained when the value of the detected outside air temperature is not smaller than a predetermined value; and (B) the calculated target air temperature is obtained when the value of the detected outside air temperature is smaller than the predetermined value.

2. An air conditioning system for a vehicle having a cabin, the system comprising:

(a) a blower for generating an air flow;

(b) an air flow passageway for introducing, into the cabin, the air flow generated by said blower;

(c) cooling means arranged in said air flow passageway for cooling air passed through the passageway;

(d) heating means arranged in said air flow passageway at a location downstream from said cooling means for heating the cooled air flowing from said cooling means;

(e) temperature adjustment means for adjusting a heated amount by said heating means for controlling a temperature of the air discharged into the cabin;

(f) signal generating means, responsive to manipulation by a passenger, for generating, selectively, an ON signal for causing the cooling means to be made on and an OFF signal for causing the cooling means to be made off;

(g) first target adjusting amount calculating means for calculating a first target adjusting amount by means of said temperature adjustment means, so as to obtain a temperature of the air discharged to the cabin equal to a target value;

(h) second target adjusting amount calculating means for calculating a second target adjusting amount by means of said temperature adjustment means, so as to obtain a temperature of the air discharged to the cabin lower than said target value;

(i) first control means for allowing said ON signal and said OFF signal to be selectively transmitted into said cooling means for making the cooling means to be selectively made on and off;

(j) heating condition determining means for determining if the cabin is under a condition where a heating is necessary;

(k) second control means for:
(A) when it is determined that heating is necessary based upon a determination by the heating condition determining means, controlling said temperature adjustment means in accordance with said first target adjusting amount under both of ON and OFF conditions of said cooling means by means of said first control means, and
(B) when it is determined that heating is not necessary based upon a determination by the heating condition determining means,
(B1) controlling said temperature adjustment means by means of said first control means in accordance with said first target adjusting amount under ON condition of said cooling means and
(B2) controlling said temperature adjusting means by means of said first control means in accordance with said second target adjusting amount under OFF condition of the cooling means.

3. A system according to claim 2, wherein said heating condition determining means comprises:

physical amount detecting means for detecting a physical amount related to an outside air temperature and means for determining a heating condition of the cabin based on the detected physical amount.

4. A system according to claim 3, wherein said physical amount detecting means comprises an outside air temperature sensor detecting an outside air temperature.

5. A system according to claim 3, wherein said physical amount detecting means comprises a sensor for detecting a temperature of the air just after being cooled by said cooling means.

6. A system according to claim 2, wherein said second control means comprises:

ON condition determining means for, upon a negative determination of said condition by said heating condition determining means, determining if said ON signal is issued from said signal generating means, and means for, upon a positive determination by said of said ON condition determining means, controlling said temperature adjustment means in accordance with said first target adjusting amount, and for, upon a negative determination by said of said ON condition determining means, controlling said temperature adjustment means in accordance with said second target adjusting amount.

7. A system according to claim 2, wherein said second control means comprises:

OFF condition determining means for, upon a negative determination of said condition by said heating condition determining means, determining if said OFF signal is issued from said signal generating means, and;

means for, upon a positive determination by said of said OFF condition determining means, controlling said temperature adjustment means in accordance with said second target adjusting amount, and for, upon a negative determination by said of said OFF condition determining means, controlling said temperature adjustment means in accordance with said first target adjusting amount.

8. A system according to claim 2, further comprising:

a temperature setter for obtaining a setting of a desired cabin temperature;

load detecting means for detecting a thermal load at the cabin; and discharged air target temperature calculating means for calculating said predetermined target value of the temperature at least in accordance with the desired cabin temperature set by said temperature setter and the temperature load detected by said load detecting means.

9. A system according to claim 2, wherein said cooling means comprises an evaporator located in a refrigerating system which includes in addition to the evaporator, a compressor for a refrigerant, a condenser for liquidizing the refrigerant compressed by the compressor and a pressure reducer for reducing the pressure of the liquidized refrigerant as received by the evaporator.

10. A system according to claim 9, wherein the system is used for a vehicle having a driving source and wherein the system further comprises:

connecting means for drivingly connecting said cooling means with said driving source, wherein said first control means controls the connecting means so that the compressor is drivingly connected with said driving source, and wherein said control means controls the connecting means so that the compressor is drivingly disconnected from said driving source.

* * * * *